(12) United States Patent
Tai et al.

(10) Patent No.: US 8,141,573 B2
(45) Date of Patent: Mar. 27, 2012

(54) MICROFLUIDIC VALVE HAVING FREE-FLOATING MEMBER AND METHOD OF FABRICATION

(75) Inventors: Yu-Chong Tai, Pasadena, CA (US); Po-Jui Chen, Pasadena, CA (US); Damien C. Rodger, Los Angeles, CA (US); Mark S. Humayun, Glendale, CA (US)

(73) Assignee: California Institute of Technology, Pasadena, CA (US)

( * ) Notice: Subject to any disclaimer, the term of this patent is extended or adjusted under 35 U.S.C. 154(b) by 117 days.

(21) Appl. No.: 12/565,636

(22) Filed: Sep. 23, 2009

(65) Prior Publication Data

US 2010/0025613 A1 Feb. 4, 2010

Related U.S. Application Data

(62) Division of application No. 11/837,450, filed on Aug. 10, 2007, now Pat. No. 7,600,533.

(60) Provisional application No. 60/836,883, filed on Aug. 10, 2006.

(51) Int. Cl.
*F16K 15/00* (2006.01)

(52) U.S. Cl. ................. 137/15.19; 137/533.19

(58) Field of Classification Search ............. 137/516.25, 137/516.27, 533.19, 859, 15.18, 15.19; 251/367, 251/368
See application file for complete search history.

(56) References Cited

U.S. PATENT DOCUMENTS

| | | |
|---|---|---|
| 4,457,757 A | 7/1984 | Molteno |
| 4,531,543 A | 7/1985 | Markley |
| 4,554,918 A | 11/1985 | White |
| 4,750,901 A | 6/1988 | Molteno |
| 4,867,200 A | 9/1989 | Markley |
| 5,071,408 A | 12/1991 | Ahmed |
| 5,411,473 A | 5/1995 | Ahmed |
| 5,454,796 A | 10/1995 | Krupin |

(Continued)

FOREIGN PATENT DOCUMENTS

JP 2006214837 8/2006

(Continued)

OTHER PUBLICATIONS

S. Shoji et al., "Microflow Devices and Systems," Journal of Micromechanics and Microengineering, 1994, pp. 157-171, vol. 4.

(Continued)

*Primary Examiner* — John Rivell
(74) *Attorney, Agent, or Firm* — Bingham McCutchen LLP

(57) ABSTRACT

Micro check valves having a free-floating member for controlling flow of fluid in microfluidic and biomedical applications and methods of fabrication. A micro check valve includes a valve seat, a valve cap that contacts the valve seat and an untethered floating member that can move between the valve seat and the valve cap. Certain micro check valves have zero cracking pressure and no reverse leakage. Certain other valves may be configured to permit flow of fluid within a pressure range. The floating member can be solid or define an orifice, and the valve seat can have one or two levels. Valves can be configured to allow fluid to flow when the floating member is pushed by fluid against the valve cap or against the valve seat. The valve seat may be silicon or another material that is compatible with micromachining processes, and the valve cap and the floating member may be a polymer such as Parylene.

14 Claims, 22 Drawing Sheets

U.S. PATENT DOCUMENTS

| | | | |
|---|---|---|---|
| 5,476,445 | A | 12/1995 | Baerveldt et al. |
| 5,490,220 | A | 2/1996 | Loeppert |
| 5,785,674 | A | 7/1998 | Mateen |
| 6,237,619 | B1 | 5/2001 | Maillefer et al. |
| 6,240,962 | B1 | 6/2001 | Tai et al. |
| 6,334,761 | B1 | 1/2002 | Tai et al. |
| 6,345,502 | B1 | 2/2002 | Tai et al. |
| 6,470,904 | B1 | 10/2002 | Tai et al. |
| 6,499,297 | B2 | 12/2002 | Tai et al. |
| 6,536,213 | B2 | 3/2003 | Tai et al. |
| 6,554,591 | B1 | 4/2003 | Dai et al. |
| 6,612,535 | B1 | 9/2003 | Tai et al. |
| 6,699,394 | B2 | 3/2004 | Tai et al. |
| 6,709,604 | B2 | 3/2004 | Tai et al. |
| 6,712,591 | B2 | 3/2004 | Lee |
| 7,025,740 | B2 | 4/2006 | Ahmed |
| 7,600,533 | B2 * | 10/2009 | Tai et al. .................. 137/516.25 |
| 2001/0014438 | A1 | 8/2001 | Tai et al. |
| 2001/0019034 | A1 | 9/2001 | Tai et al. |
| 2002/0062645 | A1 | 5/2002 | Tai et al. |
| 2006/0247664 | A1 | 11/2006 | Meng et al. |

FOREIGN PATENT DOCUMENTS

| | | |
|---|---|---|
| WO | WO-2004/011143 | 2/2004 |

OTHER PUBLICATIONS

A. Van Den Berg et al., "Micro Total Analysis Systems: Microfluidic Aspects, Integration Concept and Applications," Topics in Current Chemistry, 1997, pp. 21-50, vol. 194.

S. Shohi, "Fluids for Sensor Systems," Topics in Current Chemsitry, 1998, pp. 173-178, vol. 194.

X.Q. Wang et al., "A Parylene Micro Check Valve," Proc. MEMS 1999 Conf., Orlando, FL, Jan. 17, 1999, pp. 177-182.

J. Xie et al., "Surface Micromachined Leakage Proof Parylene Check Valve," Proc. MEMS 2001 Conf., Interkaken, Switzerland, Jan. 21, 2001, pp. 539-542.

J. Shih, et al., "Surface Micromachined and Integrated Capacitive Sensors for Microfluidic Applications," Proc. Transducers 2003 Conf., Bostaon, Jun. 8, 2003, pp. 388-391.

http://www.esp2000.ro/articol.php?id_ar=2222, "Surface Mount Microphone based on MEMS technology . . . ," Nov. 2003, Issue No. 3.

E. Meng et al., "Implantable Parylene MEMS for Glaucoma Therapy," Tech. Digest, The 3rd IEEE EMBS Special Topic Conf. . . . , May 12, 2005, pp. 116-119.

P.V. Loeppert et al., SiSonicTM—The First Commercialized MEMS microphone, Proc. HiltonHead 2006 Workshop, Jun. 4, 2006, pp. 27-30.

P.-J. Chen, et al., "Surface-Micromachined In-Channel Parylene Dual Valves for Unpowered Microflow Regulation," Tech. Digest, HiltonHead 2006 Workshop, Jun. 4, 2006, pp. 205-209.

K.W. Oh et al., "A Review of Microvalves," Journal of Micromechanics and Microengineering, 2006, pp. R13-R39, 16 (5).

T. Gervais et al., "Flow-Induced Deformation of Shallow Microfluidic Channels," Lab on a Chip, 2006, pp. 500-507, 6(4).

P.-J. Chen, et al.,"Floating-disk parylene micro check valve," Tech. Dig., The 20th IEEE Int'l Conf. on Micro Electro Mech. Sys., Kobe, Japan, Jan. 21, 2007, pp. 453-456.

http://www.knowlesacoustics.com/html/sil_mic.html#modelchart, "SciSonic".

PCT Search Report and Written Opinion for related PCT application PCT/US07/75746 from the International Search Authority, Applicant: California Institute of Technology, Forms PCT/ISA/210, 220 and 237, mailed on Sep. 12, 2008 (10 pages).

PCT International Preliminary Report on Patentability for PCT/US2007/075746, Applicant California Institute of Technology, Form PCT/IPEA/416 and 409, dated Feb. 9, 2009 (8 pages).

English Translation of Office Action mailed Aug. 2, 2011 for Japanese Patent Application No. 2009-524019 (3 pages).

* cited by examiner

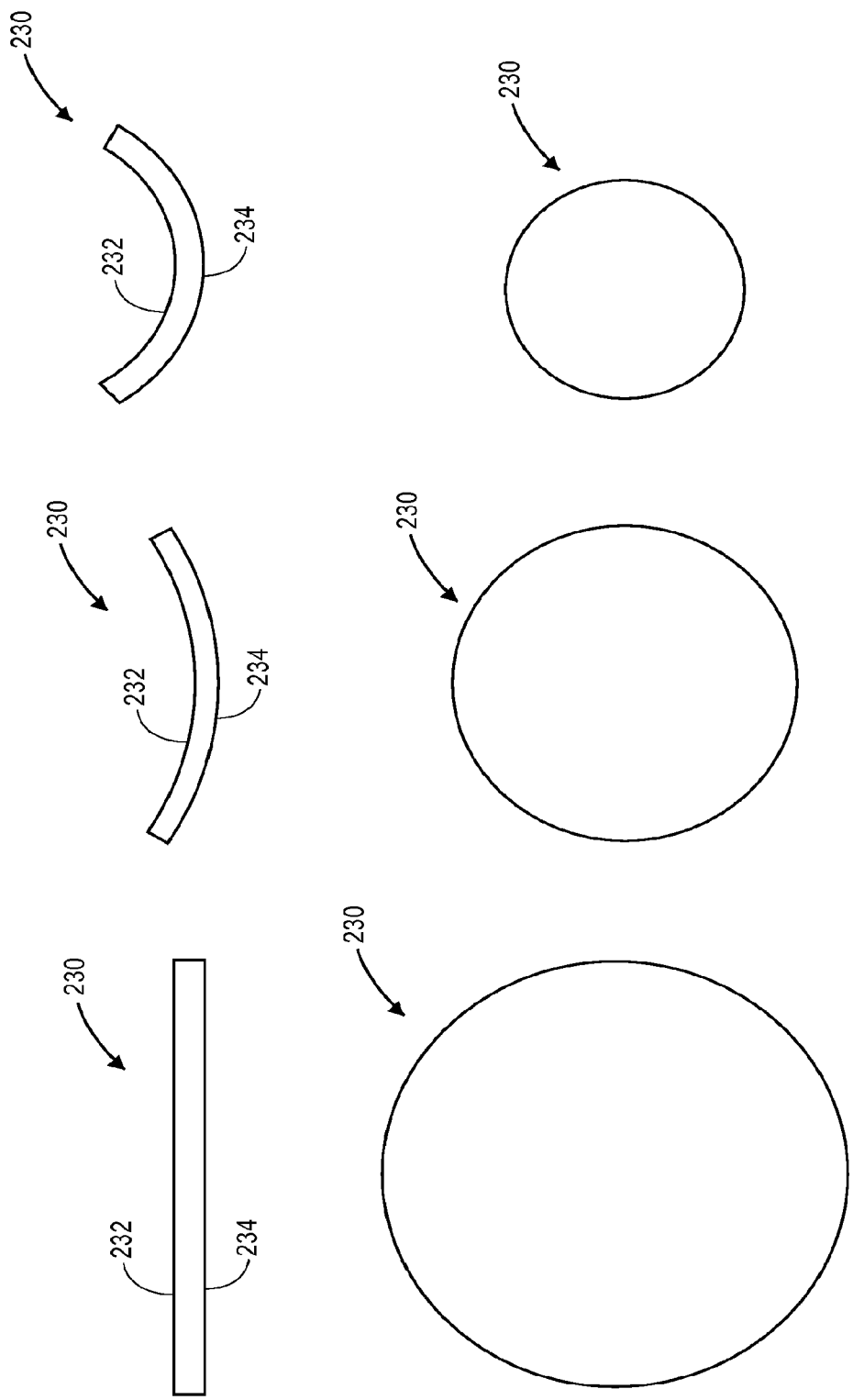

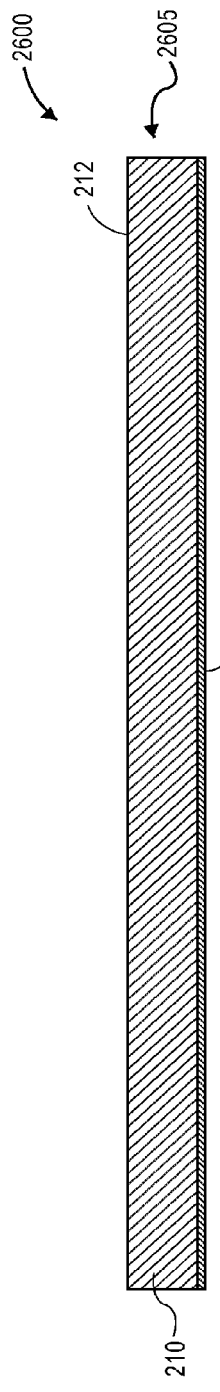
Figure 26A Thermal oxidation
Backside oxide patterning
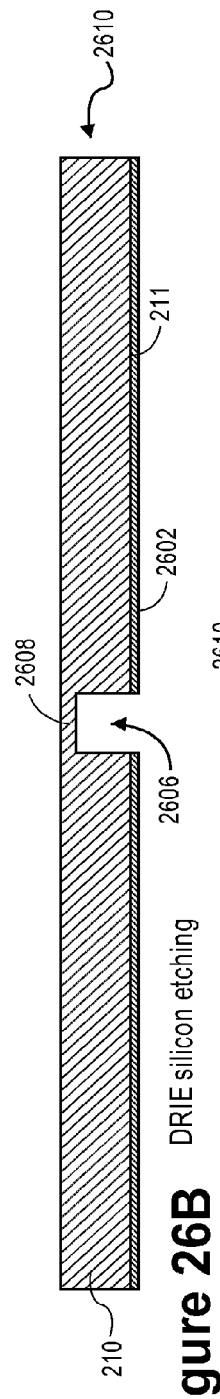
Figure 26B DRIE silicon etching
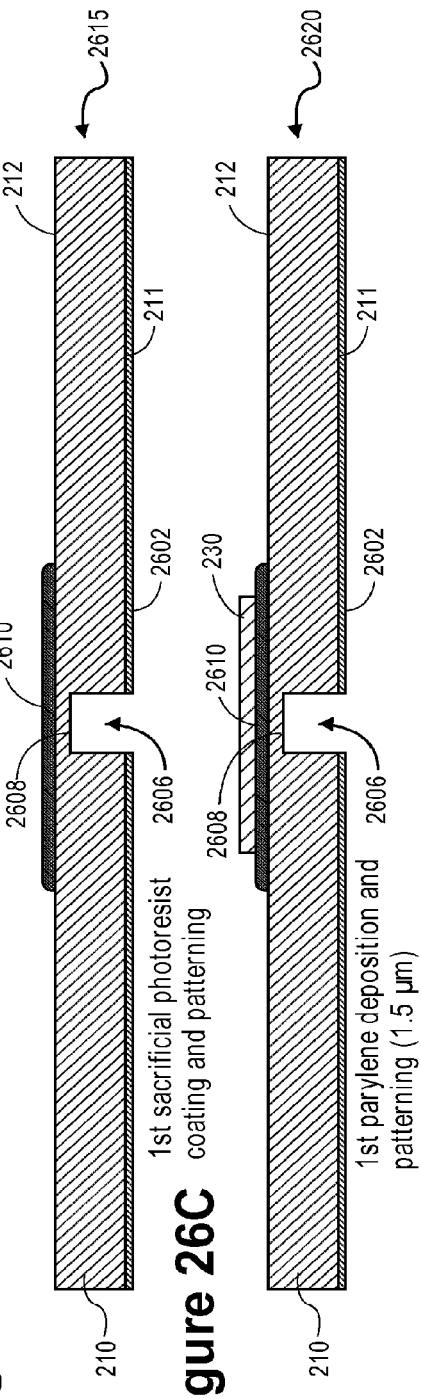
Figure 26C 1st sacrificial photoresist coating and patterning
Figure 26D 1st parylene deposition and patterning (1.5 μm)

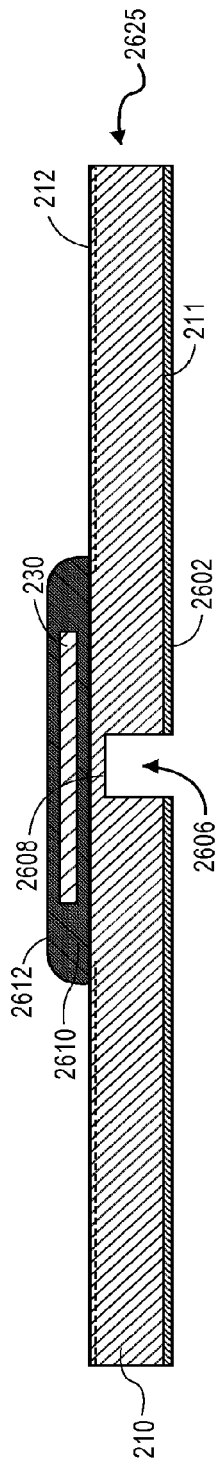
Figure 26E 2nd sacrificial photoresist coating and patterning XeF$_2$ silicon roughening
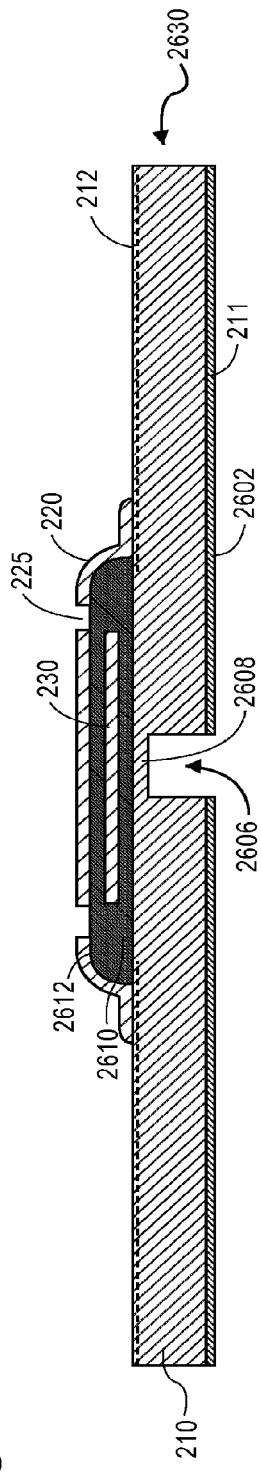
Figure 26F 2nd parylene deposition and patterning (3 μm)
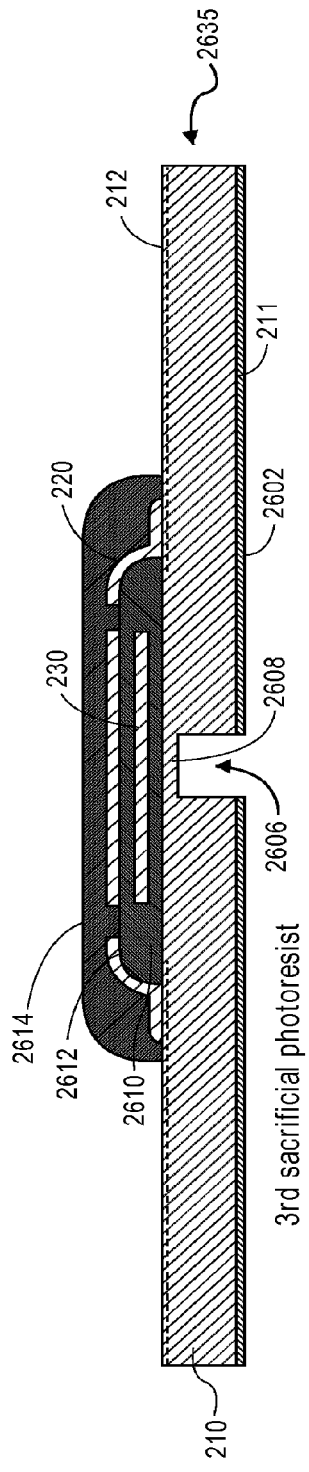
Figure 26G 3rd sacrificial photoresist coating and patterning

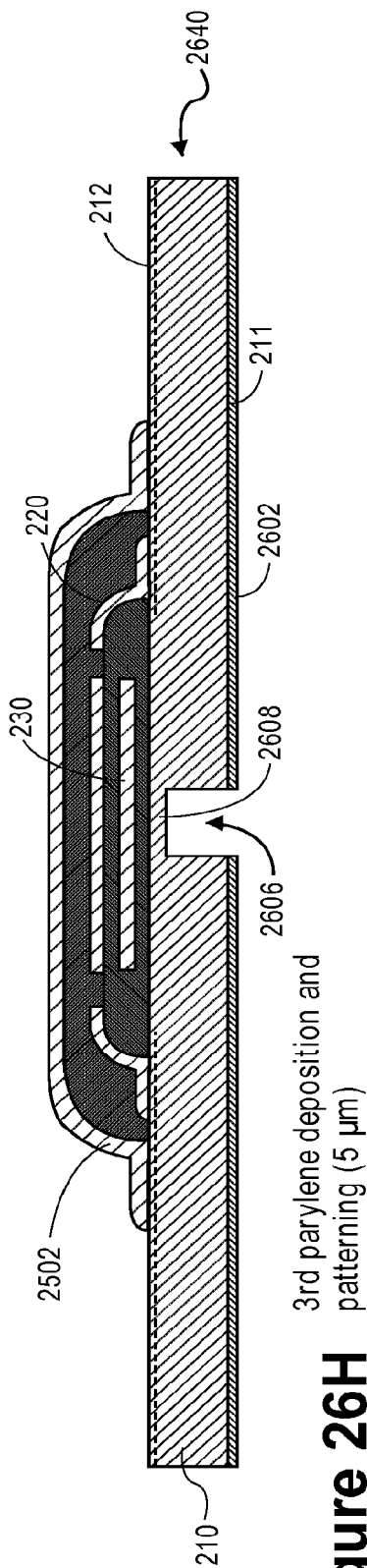
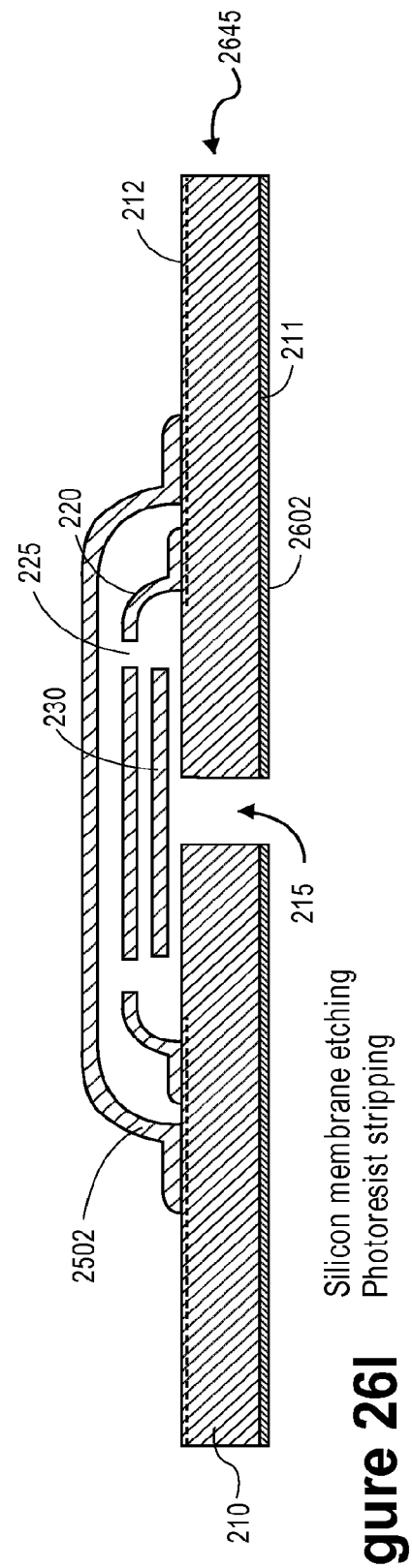
Figure 26H — 3rd parylene deposition and patterning (5 μm)
Figure 26I — Silicon membrane etching Photoresist stripping

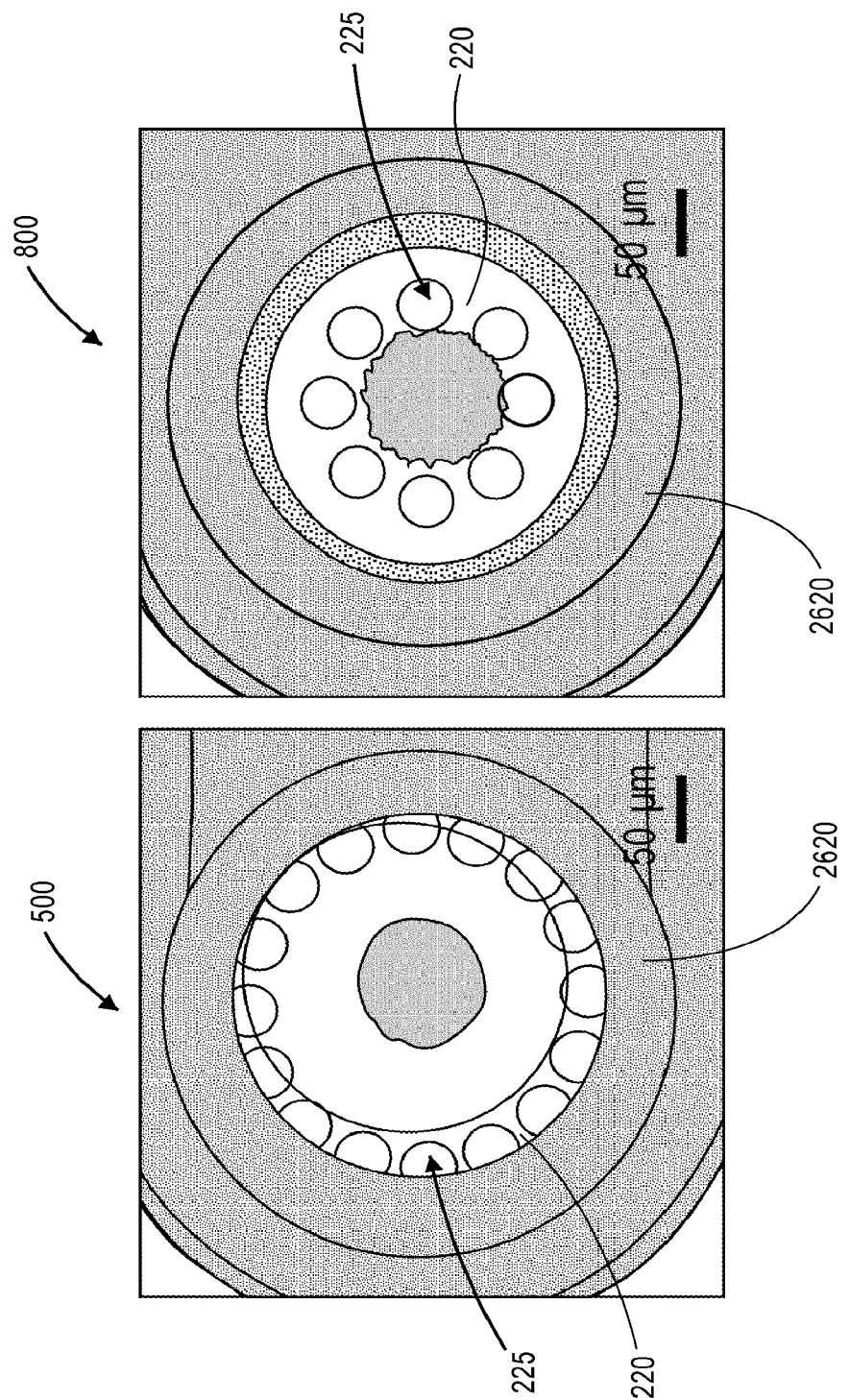

MICROFLUIDIC VALVE HAVING FREE-FLOATING MEMBER AND METHOD OF FABRICATION

CROSS REFERENCE TO RELATED APPLICATIONS

This application is a divisional application of and claims priority from co-pending U.S. patent application Ser. No. 11/837,450, filed Aug. 10, 2007, which claims priority from U.S. Provisional Application Ser. No. 60/836,883, filed on 10 Aug. 2006, the contents of which are incorporated herein by reference as though set forth in full.

STATEMENT REGARDING FEDERALLY SPONSORED RESEARCH

The U.S. Government has certain rights in this invention pursuant Grant No. EEC0310723, awarded by the National Science Foundation.

FIELD OF THE INVENTION

The field of the invention relates to microfluidic valves and, more particularly, to micro check valves for use in biomedical and microfluidics applications.

BACKGROUND

Microfluidic valve devices have been used in various biomedical applications. One known application is to implant micro check valves into an eye to treat glaucoma. Glaucoma is a well known ocular disease that affects millions of people. Persons afflicted with this disease require treatment for life. The disease causes visual field loss and if left untreated, may result in permanent loss of vision, and is a primary cause of blindness in the United States and elsewhere. The exact cause of glaucoma is not known, but it is characterized by pathological changes in the optic disc and nerve fiber of the retina. Studies suggest that development of the disease may be attributable to various factors including elevated intraocular pressure.

The intraocular pressure of a normal eye typically ranges from about 10 to about 21 mm Hg, e.g. about 15 mm Hg. Intraocular pressures of eyes of patients having glaucoma often exceed 21 mm, although glaucoma may be present when intraocular pressures are normal. Elevated intraocular pressures are believed to be responsible for slowly damaging the optic nerve which, in turn, can cause blind spots in the field of vision. Total blindness may occur if the entire optic nerve is destroyed.

It is known to implant devices for draining fluid from the eye in order to reduce intraocular pressure. One known implant device is known as a Molteno® implant. Earlier generation Molteno® implants were non-valved, free-flow implants having a scleral plate to promote formation of a functioning bleb and a tube that extends into the anterior chamber of the eye. The tube allows aqueous humor to flow from the anterior chamber to the plate where it is absorbed. However, these types of ocular implant devices are designed for continuous drainage and, therefore, may result in excessive drainage of fluid. Further, these types of implants do not provide sufficient drainage control. Thus, devices of this type may not be optimal for regulating intraocular pressure.

Another known implant is known as the Ahmed® valve, which is manufactured by New World Medical, Inc. in Rancho Cucamonga, Calif. This valve includes a restrictive element to reduce hypotony issues of certain Molteno® implants. The Ahmed® valve includes a silicone tube attached to a polypropylene body and plate. The valve mechanism includes two silicone elastomer membranes, and the valve is designed to open at a certain threshold pressure (about 8 mm Hg).

The Ahmed® valve, however, may be improved to enhanced regulation of intraocular pressure. Initially, implantation of the Ahmed® valve may be complicated due to the large size of the device. Additionally, implanting the Ahmed® valve requires use of sutures, which is not desirable. Further, the Ahmed® valve involves use of the Venturi effect to reduce flow rate, but does not provide for blockage or flow cut-off at higher pressures. In other words, the Ahmed® valve, like the Molteno® implant, does not allow for "band pass" functionality and is not able to prevent excessive drainage of fluid at high intraocular pressures, e.g., temporary elevated intraocular pressures caused by rubbing or pressing of the eye.

Referring to FIG. 1, known micro check valves, including those valves used to treat intraocular pressure and in other biomedical applications, such as free-flow Molteno® implants, are characterized by cracking pressure and/or reverse leakage. Cracking pressure is a minimum pressure that is required to open a valve for forward fluid flow. As shown in FIG. 1, in which the "x" axis represents fluid pressure and the "y" axis represents a corresponding flow rate, upon exceeding the cracking pressure, the pressure/fluid flow rate relationship is not ideal or linear. Instead, the relationship of known micro check valves is non-linear.

Further, known micro check valve devices, including the Ahmed® valve, are characterized by reverse leakage, which involves negative back flows of fluid and particles through the valve (which should be closed) and into the eye. This imperfect bidirectional valve behavior limits the practical use of known micro check valves as a flow control component in integrated microfluidics systems, particularly in miniature pressure/flow rate operations, and these behaviors exist regardless of whether micro check valves are fabricated by bulk micromachining by selectively etching a silicon substrate, or by surface-micromachining methods, which involves building structures on top of a substrate.

Thus, cracking pressure and reverse leakage continue to be technical issues with known micro check valves, and known micro check valves have not been able to achieve both zero cracking pressure and zero reverse leakage in a single device. Such micro check valve devices can be further improved in other ways, e.g., by providing additional flow controls, which would improve intraocular regulation and other biomedical applications involving microfluidics devices, and providing smaller devices that can be implanted more easily and without sutures (e.g., in the case of an ocular implant).

Therefore, it would be desirable to have implantable micro check valves improve upon cracking pressure and reverse leakage to provide a linear or ideal fluid pressure—flow rate relationship rather than non-linear relationships as shown in FIG. 1. Such devices would enhance various biomedical applications including lab on-a-chip, drug delivery, fluid regulation and other applications. Further, it would be desirable to have micro check valves that are easier to implant in a patient's eye and that are capable of regulating intraocular pressure more effectively and with enhanced fluid flow control, e.g., micro check valves that allow fluid flow within a certain range of pressures or that serve as "band pass" microflow regulators that are able to prevent excessive drainage during temporary elevated intraocular pressure caused by, e.g., rubbing, pressing or hitting the eye. It would also be desirable to have such an implantable micro check valves that can be implanted without sutures. It would also be desirable to be able to fabricate such micro check valve devices on a commercial scale using surface micromachining and MEMS technologies. Such capabilities would enhance various biomedical applications and treatment of glaucoma and other pressure-dependent physical conditions and diseases.

SUMMARY

According to one embodiment, a micro check valve for controlling flow of a liquid includes a valve seat, a valve cap and a floating member. The valve seat is comprised of a substrate material, and the valve cap is disposed on the valve seat so that a space is defined between the valve seat and the valve cap. The floating member movable in the space between the valve seat and the valve cap by application of pressure on the floating member by the liquid to passively control flow of the liquid through the valve seat and the valve cap.

According to another embodiment, a micro check valve for controlling flow of a fluid includes a multi-level valve seat, a valve cap and a floating member. The valve seat is comprised of a substrate material, and the multi-level valve seat has a first surface at a first level and a second surface at a second, lower level. The valve cap disposed on the first surface of the valve seat, and a space is defined between the valve seat and the valve cap. The floating member is movable in the space between the valve seat and the valve cap by application of pressure on the floating member by a fluid to passively control flow of the fluid through the multi-level valve seat and the valve cap.

Another embodiment is directed to a method of fabricating a micro check valve having a floating member for controlling flow of fluid. The method includes depositing a plurality of polymer layers and a plurality of sacrificial layers on a substrate in an alternating manner. The substrate includes a valve seat. The plurality of polymer layers includes a first polymer layer that forms a floating member, a second polymer layer that forms a valve cap, and a third polymer layer that forms an outer wall defining a fluid channel. The method further includes removing the sacrificial layers, thereby forming an in-channel microfluidic valve having a floating polymer member that is movable between the valve seat and the polymer valve cap.

In one or more embodiments, the valve seat defines a port, and the valve cap defines at least one orifice. The floating member may be solid or define an orifice. For example, the port may be defined through a center of the valve seat, an orifice may be defined through a center of the floating member, and the valve cap may define a plurality of orifices arranged in a circular manner around the port and the orifice of the floating member. In one configuration liquid can flow through an orifice of the valve cap, through an orifice of the floating member and through the port when the floating member is pushed by the liquid against the valve seat, whereas liquid cannot flow through the at least one orifice of the valve cap when the floating member is pushed by the liquid against the valve cap. In a configuration in which the floating member is solid, liquid can flow through the port, over the floating member, and through the at least one orifice when the floating member is pushed by the liquid against the valve cap, whereas liquid cannot flow through the port when the floating member is pushed by the liquid against the valve seat.

In one or more embodiments, a multi-level valve seat having a first surface at a first level and a second surface at a second level below the first level, and the valve cap is disposed on the first surface. Micro check valves may be configured so that the valve cap and the floating member are configured to permit flow of fluid when the fluid pressure is between a threshold pressure and a cut-off pressure so that fluid flow is stopped the fluid pressure exceeds the cut-off pressure.

In one or more embodiments, the floating member can bend under fluid pressure between a flat shape for temporarily sealing the at least one fluid channel and an arcuate shape. In this manner, the floating member can bend under fluid pressure below a first surface of a multi-level valve seat and towards a second surface of a multi-level valve seat in order to open the at least one fluid channel and permit fluid to flow through the fluid channel and the fluid port, and can bend further under fluid pressure to contact the second surface and seal the port to block fluid from flowing through the valve seat.

In one or more embodiments, the valve seat, the valve cap and the floating member are configured for continuous flow of the liquid, zero cracking pressure and zero reverse leakage and are configured to control flow of liquid fluids such as a bodily fluid, water, a solution, or a drug or medication.

BRIEF DESCRIPTION OF THE DRAWINGS

Referring now to the drawings in which like reference numbers represent corresponding parts throughout and in which:

FIG. 15 includes cross-sectional and top views of a resilient floating member that is flat and for use with a multi-level valve seat;

FIG. 16 includes cross-sectional and top views of a resilient floating member that is bent under fluid pressure and a resulting reduced diameter relative to the flat floating member shown in FIG. 15;

FIG. 17 includes cross-sectional and top views of a resilient floating member for bent to a greater degree under fluid pressure and a resulting reduced diameter relative to the bent floating member shown in FIG. 16;

FIGS. 26A-I illustrate one embodiment of a method of fabricating a micro check valve having a floating member using surface micromachining/MEMS fabrication;

FIG. 28 is a micrograph of an in-channel micro check valve having a floating member and configured as shown in FIGS. 5-7 and in a liquid environment;

FIG. 29 is a micrograph of an in-channel micro check valve having a floating member and configured as shown in FIGS. 8-10 and in a liquid environment;

DETAILED DESCRIPTION OF ILLUSTRATED EMBODIMENTS

Certain embodiments are directed to micro check valves having free-floating members or diaphragms and ideal or nearly ideal bidirectional fluidic behaviors for use in microfluidic and biomedical applications. Such micro check valves advantageously eliminate cracking pressure and reverse leakage. Such micro check valves may be used in various biomedical applications including integrated microfluidics, drug delivery and lab-on-a-chip applications. Certain other embodiments are directed to a "band pass" micro check valve having a free-floating member and a multi-level valve seat that are configured so that fluid flow stops when fluid pressure exceeds a cut-off pressure. Such micro check valves may be implanted into an eye without the need for sutures while providing enhanced regulation of intraocular pressure. Certain embodiments are directed to methods of fabricating micro check valves having a free-floating member by deposition of alternating layers of sacrificial materials and materials that will form components of a micro check valve using, for example, surface micromachining and MEMS technologies.

Figure 25:
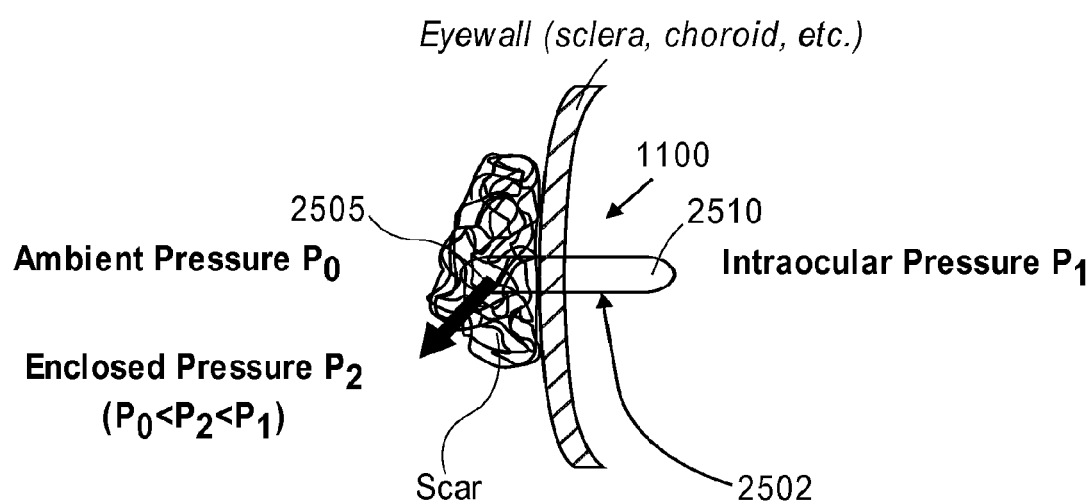
FIG. 25 generally illustrates one manner in which a micro check valve shown in FIGS. 11-25 may be implanted within an eye to regulate intraocular pressure.

FIGS. 2-10 illustrate embodiments of micro check valves for use in biomedical applications and having a free-floating member or diaphragm, a linear or substantially linear pressure-flow relationship, zero cracking pressure and no reverse leakage at pressures greater than a breakdown pressure. Such micro valves have continuous fluid flow and are well suited for biomedical applications including lab on-a-chip, drug delivery and fluid regulation. Such valves may also be adapted for use in regulating intraocular pressure for treatment of glaucoma. FIGS. 11-24 illustrate embodiments of micro check valves for use in biomedical applications, e.g., as ocular implants, and that include a resilient and bendable free-floating member and a multi-level valve seat. Such valves are configured to provide enhanced fluid flow and pressure control. FIG. 25 illustrates one manner in which a micro check valve can be implanted in an eye without sutures, e.g., for regulating intraocular pressure to treat glaucoma. FIGS. 26-31 illustrate fabrication methods, micro check valves that were fabricated with method embodiments, a test setup and test results confirming the advantages achieved with embodiments.

Figure 2:
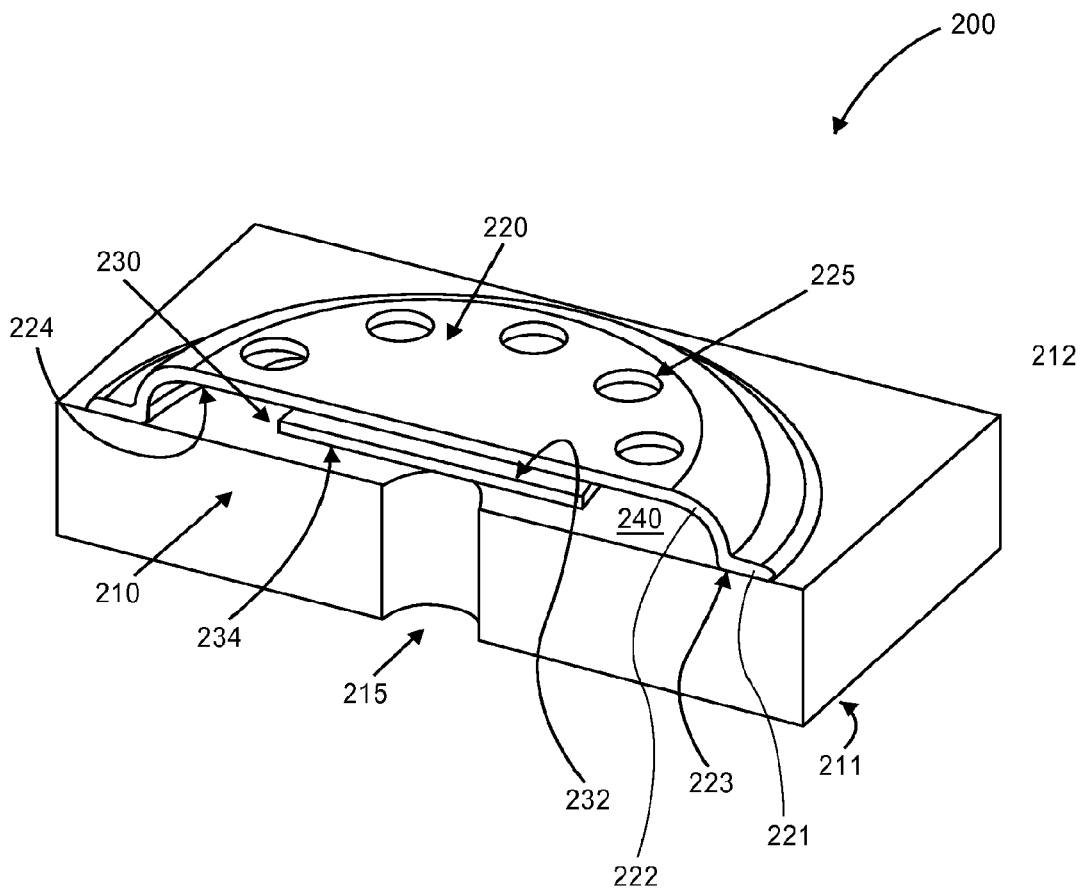
FIG. 2 is a perspective cross-sectional view of a micro check valve having a free-floating member or diaphragm constructed in accordance with one embodiment.

Referring to FIG. 2, a micro fluidic check valve 200 constructed in accordance with one embodiment includes a valve seat 210 having respective bottom and top surfaces 211, 212, a valve or sealing cap 220 (generally referred to as valve cap 220) that contacts the top surface 212 of the valve seat 210, and a free-floating member or diaphragm 230 (generally referred to floating member 230). The floating member 230 is freely movable and not connected to any external actuation device The valve seat 210, valve cap 220 and floating member 230 components may be disposed inside a tube or wall (not shown in FIG. 2, shown in FIG. 25) that defines a fluid channel. A "fluid" as used in this specification is defined as a flowable liquid or solution, examples of which include a bodily fluid (e.g., blood, aqueous humor, spinal fluid, etc.), water, a solution, a drug or medication in the form of a liquid, a liquid or solution that flows on a lab on-a-chip, and other liquids, solutions, and bodily fluids associated with biomedical applications, organs, tissue and bodily functions. In the illustrated embodiment, the valve cap 220 has a generally circular or cylindrical shape and includes a first portion or outer edge 221 and a second or inner portion 222. The valve 200 is fabricated so that a bottom surface 223 of the first portion 221 contacts and forms a seal with the top surface 211 of the valve seat 210. The second portion 222 is shaped to be raised above the top surface 211 of the valve seat 210, thereby defining the inner space 240 between the top surface 212 of the valve seat 210 and a bottom surface 224 of the second portion 222 of valve cap 220.

The floating member 230 is untethered and freely movable between the top surface 211 of the valve seat 210 and the bottom surface 224 of the second portion 222 of the valve cap 220 to passively control flow of fluid through the micro check valve 200. For ease of explanation, reference is made to the floating member 230 being movable between the top surface 211 of the valve seat 210 and the bottom surface 224 of the valve cap 230. As shown in FIG. 2, the floating member 230 is movable in two opposite directions in a plane that is perpendicular to the top surface 212 of the valve seat 210.

The valve seat 210 defines a fluid port 215 through which fluid may flow, and the valve cap 220 defines one or more orifices 215 (a plurality of orifices 215 are shown). Fluid may flow in different directions through the micro check valve 200 depending on the configuration of the valve cap 220 and orifices 225 and the configuration and position of the floating member 230.

The valve seat 210 is composed of a suitable substrate material that is compatible with micromachining processes, such as silicon, thereby allowing integration of micro check valves with other semiconductor devices. The valve cap 220 and the floating member 230 may be fabricated on the valve seat 230 using surface micromachining and MEMS technologies. According to one embodiment, the valve cap 220 and the floating member 230 are the same material. In one embodiment, the valve cap 220 and the floating member 230 are both composed of a polymer material. In one embodiment, the polymer material is Parylene (poly-para-xylylene), e.g., Parylene C, supplied by Specialty Coating Services, Inc., and sold under the trade name Parylene. Different types of Parylene may also be suitable to form the valve cap 220 and floating member 230, e.g., Parylene D, Parylene N and Parylene HT®. Further, different types of polymers other than Parylene may be utilized, and different types of materials other than polymers may be utilized.

Other suitable materials may be selected based on factors including manufacturability and ease of processing (e.g., CMOS and MEMS process compatibility); biocompatibility (e.g., materials should satisfy USP Class VI grade) and chemical inertness. For example, the valve cap 220 and the floating member 230 may also be biocompatible silicone, SU-8 negative photoresist, and biocompatible metals such as platinum, titanium and gold. The valve cap 220 and the floating member 230 may also be different types of materials, and fabrication processes (e.g., as shown in FIG. 25), may be adapted for use with other materials. Reference is made to the valve cap 220 and the floating member 230 both being composed of a polymer or Parylene for ease of explanation.

Figure 1:
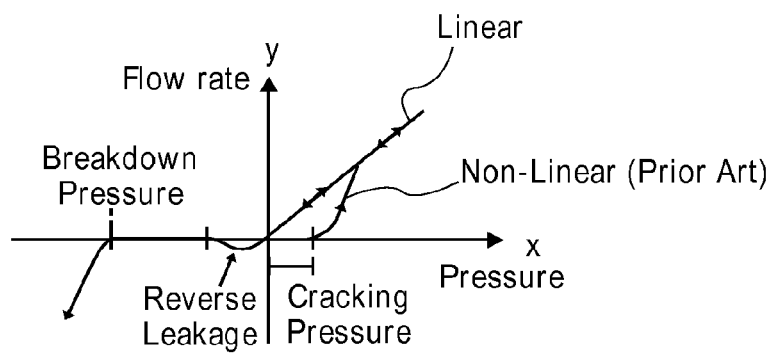
FIG. 1 is a graph generally illustrating cracking pressure, reverse leakage and non-linear pressure-flow relationships of various known micro check valves.
Figure 3:
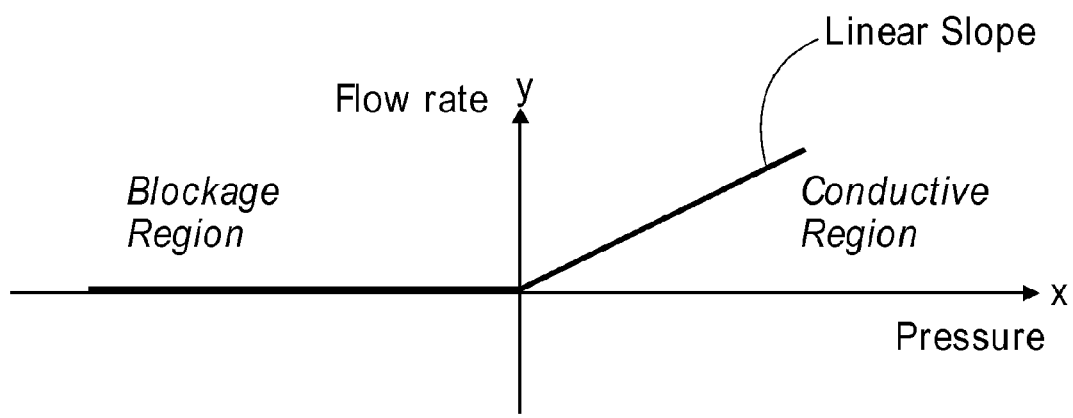
FIG. 3 is a graph generally illustrating a micro check valve constructed in accordance with one embodiment and having no cracking pressure, no reverse leakage at pressures above a breakdown pressure, and exhibiting linear pressure-flow behavior.
Figure 4:
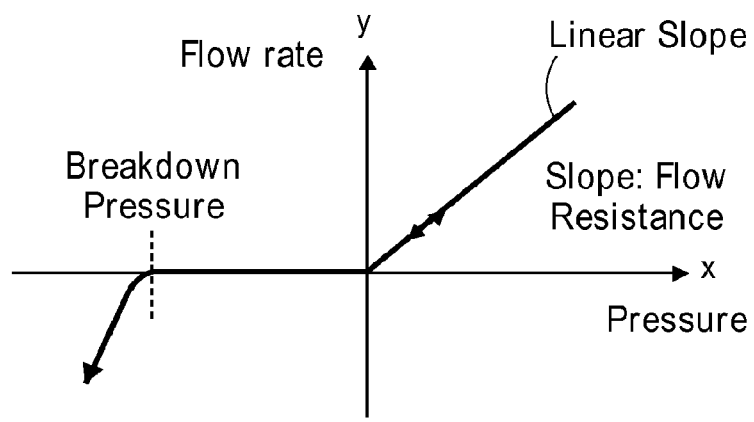
FIG. 4 is another graph generally illustrating a micro check valve constructed in accordance with one embodiment and having no cracking pressure, no reverse leakage at pressures above a breakdown pressure, and exhibiting linear bidirectional pressure-flow behavior.

During use, the top surface 232 of the floating member 230 may be forced against the bottom surface or underside 224 of the valve cap 220 by application of pressure against the bottom surface 234 of the floating member 230 by a liquid or fluid. The floating member 230 may also be forced against the top surface 212 of the valve seat 210 by application of pressure pushing against the top surface 234 of the floating member 230 by fluid. In this manner, as shown in FIGS. 3 and 4, microfluidic valve 200 components are structured so that the valve 200 opens and closes with bidirectional movement of the untethered, free-floating member 230 to provide a micro check valve 200 having zero cracking pressure. Additionally, as shown in FIG. 4, bidirectional fluid flows through the valve 200 are characterized by linear (ideal) or substantially linear pressure—flow relationships and a consistent blockage region that prevents reverse flows or reverse leakage at fluid pressures between the breakdown pressure and zero, thus providing significant improvements over known micro check valve devices, which are characterized by non-zero cracking pressures, non-linear pressure—fluid flow relationships and reverse leakage (shown in FIG. 1).

Figure 5:
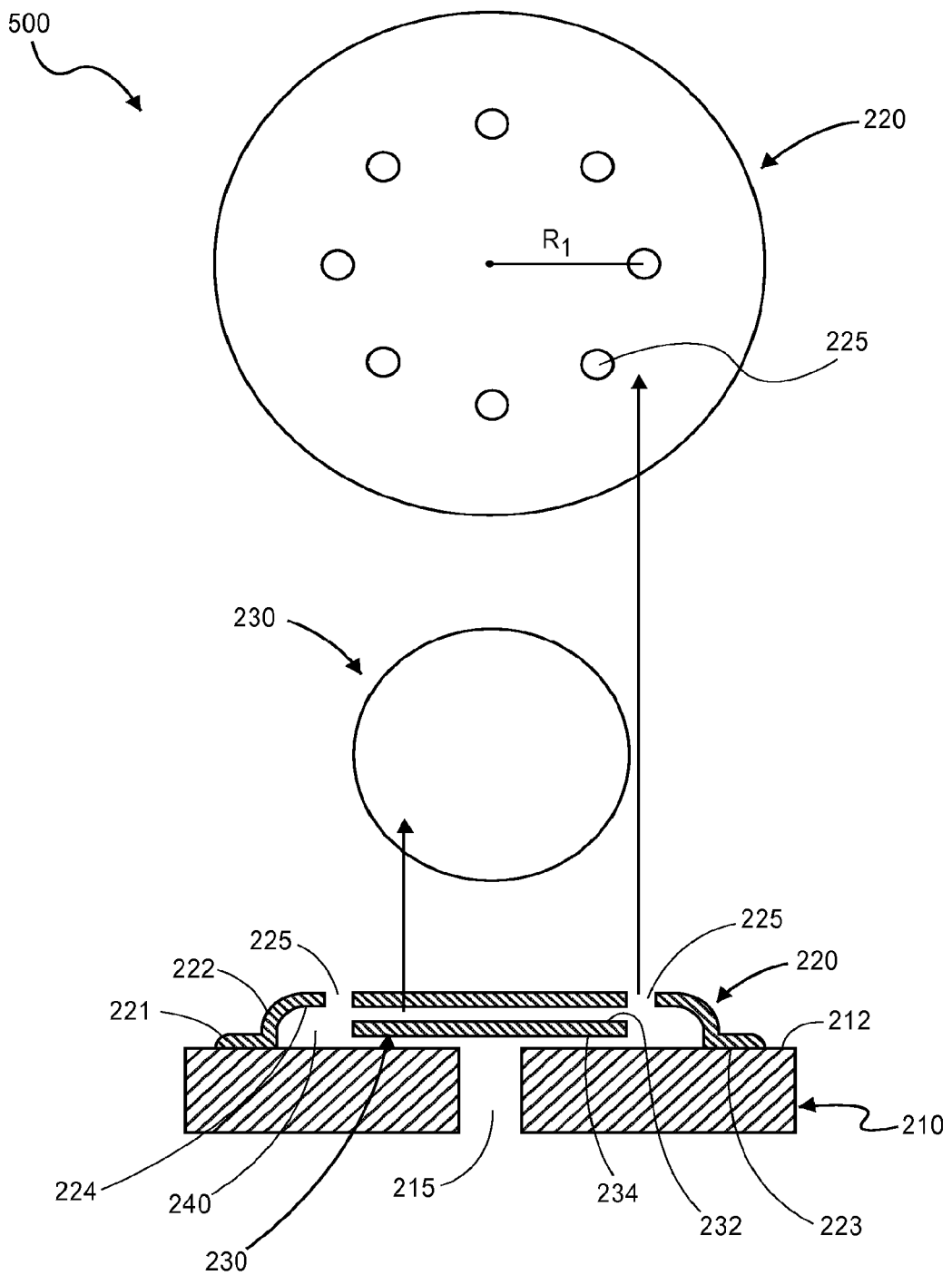
FIG. 5 includes cross-sectional and top views of components of a micro check valve constructed according to one embodiment having no cracking pressure, no reverse leakage at pressures above a breakdown pressure and exhibiting a linear pressure-flow relationship.
Figure 7:
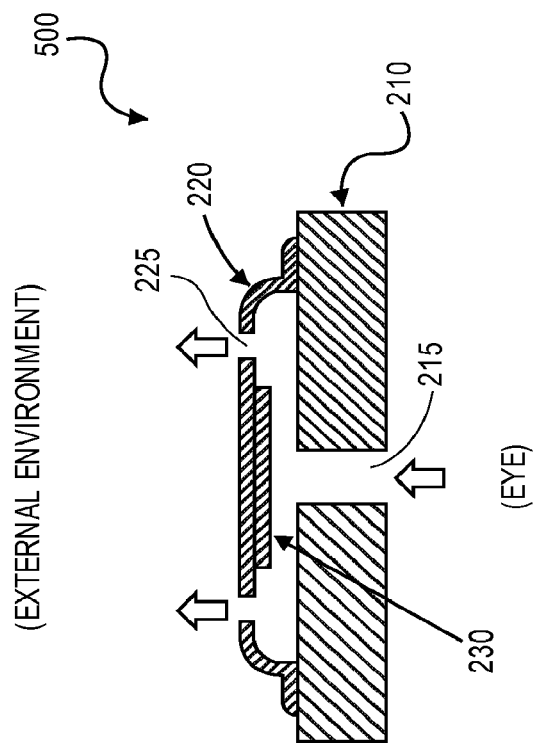
FIG. 7 is a cross-sectional view of components shown in FIG. 5 arranged so that the micro check valve is opened by a solid floating member being pushed by fluid against a valve cap that includes an orifice.
Figure 6:
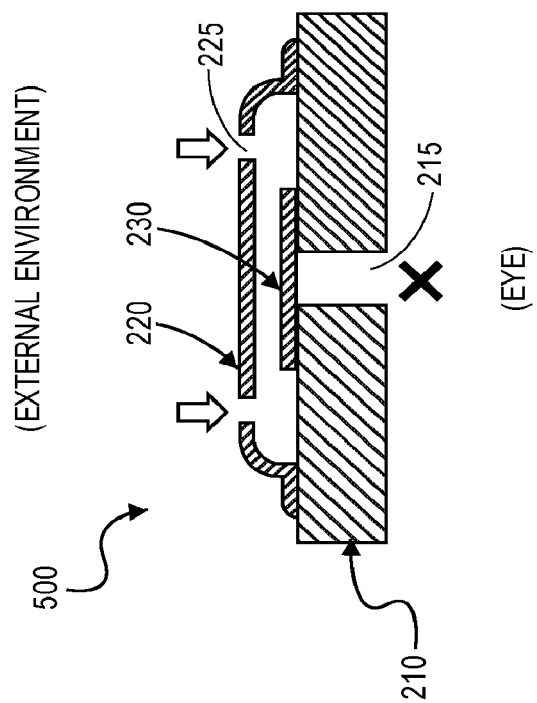
FIG. 6 is a cross-sectional view of components shown in FIG. 5 arranged so that the micro check valve is closed by a solid floating member being pushed by fluid against a valve seat.

Referring to FIGS. 5-7, a microfluidic check valve 500 constructed in accordance with one embodiment includes the valve seat 210, valve cap 220 and floating member 230 components described above with respect to FIG. 2. In the illustrated embodiment, the valve cap 220 includes a plurality of orifices 225, and the floating member 230 is a solid disc. Further, in the illustrated embodiment, the fluid port 215 is defined through a center of the valve seat 210 and aligned with center portions of the floating member 230 and the valve seat 220. The plurality of orifices 225 may be positioned radially outwardly relative to an axis defined by the port 215 and the center of the valve cap 220. The distance between a center of the valve cap 220 and the plurality of orifices 225 is shown as being a radius (R1). In the illustrated embodiment, the floating member 230 has a diameter that is approximately 2*(R1), but the size floating member 230 may vary depending on the valve cap 220 and floating member 230 configuration while still providing the valve functionality described in further detail with reference to FIGS. 6 and 7.

Referring to FIG. 6, the micro check valve 500 is configured so that fluid cannot flow through the orifices 225 of the valve cap 220 and through the port 215 when the solid floating member 230 is pushed by fluid against the top surface 212 of the valve seat 210. This, in turn, covers and seals the port 215, thereby preventing reverse leakage from the external environment (represented by "x" in FIG. 6).

Referring to FIG. 7, fluid pressure pushes the floating member 230 from the surface 212 and against the bottom surface 224 of the valve cap 220. As a result, a fluid path is opened through the port 215, over the floating member 230, and through the orifices 225 of the valve cap 220, thereby allowing continuous fluid flow through the valve 500.

According to one embodiment, the width of the valve seat 210 or substrate may be about 500 microns, and the thickness of the valve seat 210 may be about 500 microns. The port 215 may be centrally positioned and have a diameter of about 100 microns. The valve cap 220 may have a width or diameter of about 300 microns, and each orifice 225 may have a diameter of about 50 microns and be positioned so that the radius R1 is about 130 microns. The solid floating member 230 may be a disc having a diameter of about 250 microns, and a thickness of about 2 microns. A micro check valve 500 configured as shown in FIGS. 5-7 and having these exemplary dimensions has zero cracking pressure and no reverse leakage, as shown in FIGS. 3 and 4.

Figure 8:
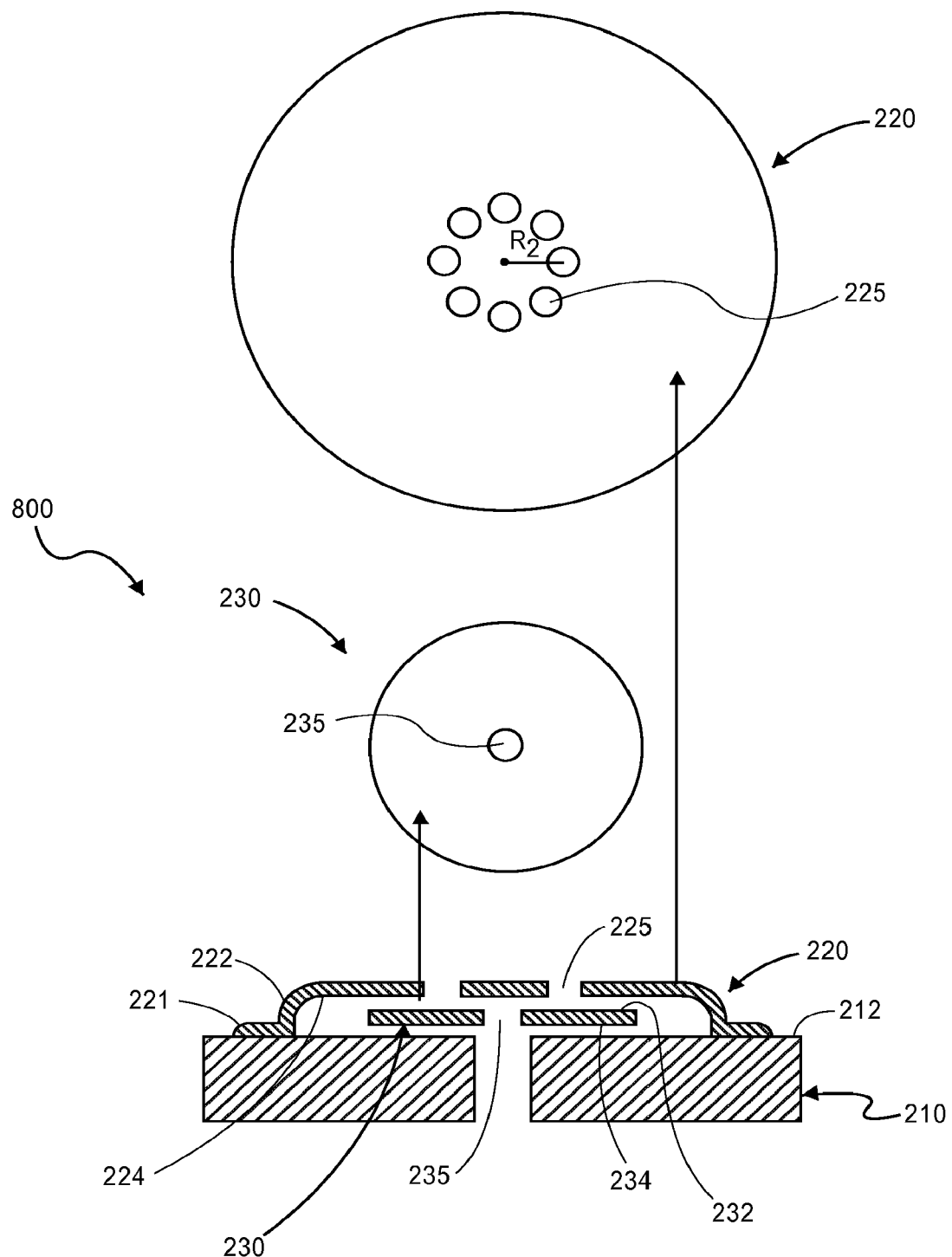
FIG. 8 includes cross-sectional and top views of components of a micro check valve constructed according to another embodiment having no cracking pressure and no reverse leakage at pressures above a breakdown pressure and exhibiting a linear pressure-flow relationship.
Figure 10:
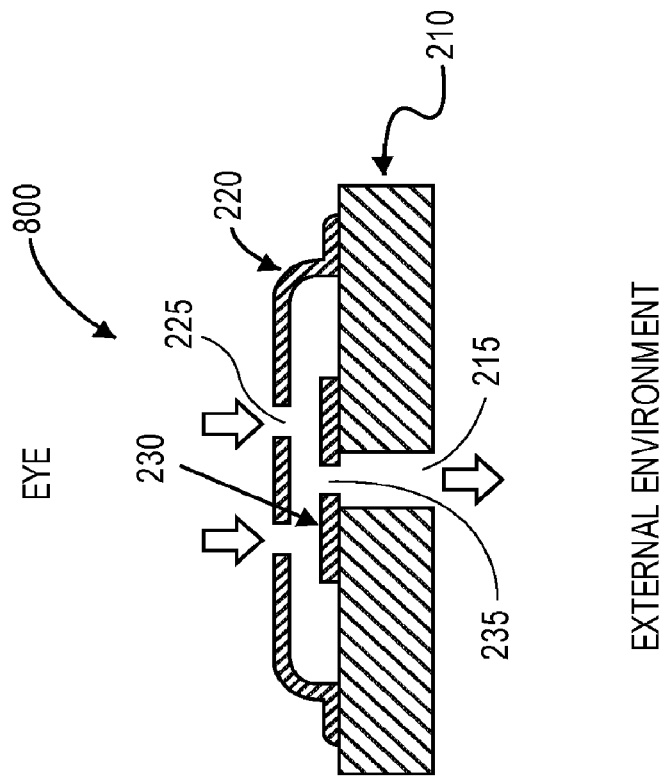
FIG. 10 is a cross-sectional view of components shown in FIG. 8 arranged so that the micro check valve is opened by a floating member including an orifice being pushed by fluid against a valve seat.
Figure 9:
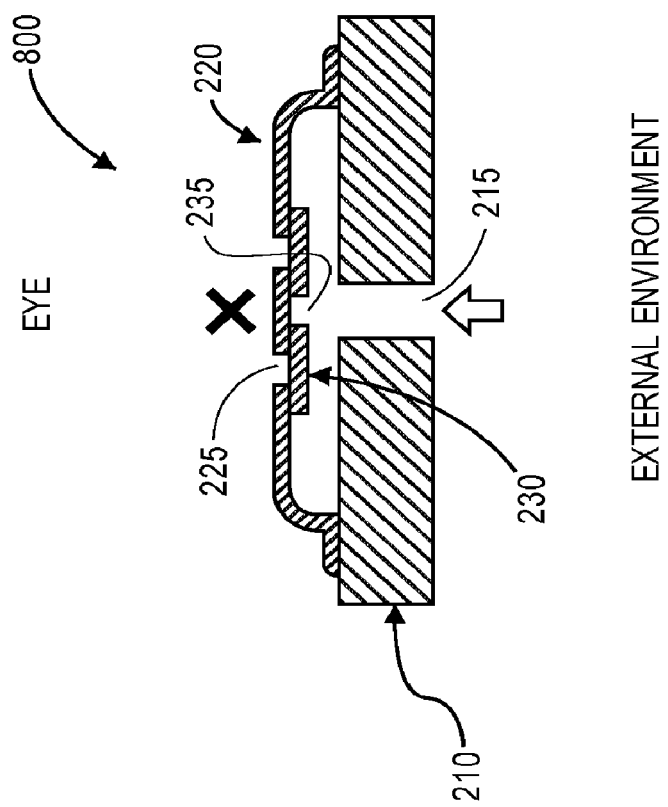
FIG. 9 is a cross-sectional view of components shown in FIG. 8 arranged so that the micro check valve is closed by a floating member including an orifice being pushed by fluid against a valve cap that also includes an orifice.

Referring to FIGS. 8-10, a micro check valve 800 constructed in accordance with another embodiment includes valve seat 210, valve cap 220 and floating member 230 components described above with respect to FIGS. 2 and 5, however, in the illustrated embodiment, the valve cap 220 includes a plurality of orifices 215 and the floating member 230 also includes an orifice 235. In the illustrated embodiment, the port 215 is defined through a center of the valve seat 210 (as shown in FIGS. 5-7), and the plurality of orifices 225 are positioned radially outwardly relative to the port 215 and a center of the valve cap 220. The distance between a center of the valve cap 220 and the plurality of orifices 225 is shown as a radius (R2), which is less than radius (R1) (shown in FIG. 5). In the illustrated embodiment, the floating member 230 has a diameter that is greater than 2*(R2), but the size floating member 230 may vary while still providing the valve functionality shown in FIGS. 9 and 10, and depending on the valve cap 220 and floating member 230 configuration.

Referring to FIG. 9, the micro check valve 800 is configured so that fluid cannot flow through the port 215, through the orifice 235 of the floating member 230 and through the orifices 225 of the valve cap 220 when the floating member 230 is pushed by fluid against the bottom surface 224 of the valve cap 220. More particularly, a central portion of the valve cap 220 covers the orifice 235 of the floating member 230, thereby sealing the orifice 235. Additionally, solid portions of the floating member 230 adjacent to the orifice 235 cover the orifices 225 of the valve cap 220, thereby sealing the orifices 225. Thus, solid portions of the valve cap 220 seal the orifice 235 of the floating member 230, and solid portions of the floating member 235 seal orifices 225 of the valve cap 220. As a result, fluid is only able to pass through the port 215 and into the inner space 240, but is blocked from passing through the orifices 225, 235, thereby preventing reverse leakage and backward flows.

Referring to FIG. 10, fluid pressure applied to the top surface 232 of the floating member 230 pushes the floating member 230 against the top surface 212 of the valve seat 210. A fluid channel is thus opened through the orifices 225 of the valve cap 220, through the orifice 235 of the floating member 230, through the port 215, thereby allowing continuous fluid flow through the valve 500.

According to one embodiment, the width of the valve seat 210 or substrate may be about 500 microns, and the thickness of the valve seat 210 may be about 500 microns. The port 215 may be centrally positioned and have a diameter of about 100 microns. The valve cap 220 may have a width or diameter of about 300 microns, and each orifice 225 may have a diameter of about 50 microns and be positioned so that the radius R2 is about 75 microns. The floating member 230 having the aperture 235 may be a disc having a thickness of about 2 microns and a diameter of about 250 microns. The orifice 235 may be centrally positioned and have a diameter of about 50 microns. A micro check valve 800 having these exemplary dimensions has zero cracking pressure and no reverse leakage as shown in FIGS. 3 and 4.

Micro check valves 500 and 800 having zero cracking pressure, no reverse leakage and continuous fluid flow are particularly suitable for various biomedical applications including lab on-a-chip, drug delivery and fluid regulation applications and micro-high-performance-liquid-chromatography (PHPLC) and other analytical chemistry applications. Further, such valves 500 and 800 may be adapted for other biomedical applications including, but not limited to, regulating elevated intraocular pressure, shunting excessive cerebrospinal fluid from cerebral ventricles, draining blood for treatment of aneurysms and other occlusions. FIGS. 11-25 illustrate components and implantation of a micro check valve that has band pass capabilities so that excessive draining of fluid is limited in the event of temporary elevated pressure or short pressure spikes.

Figure 11:
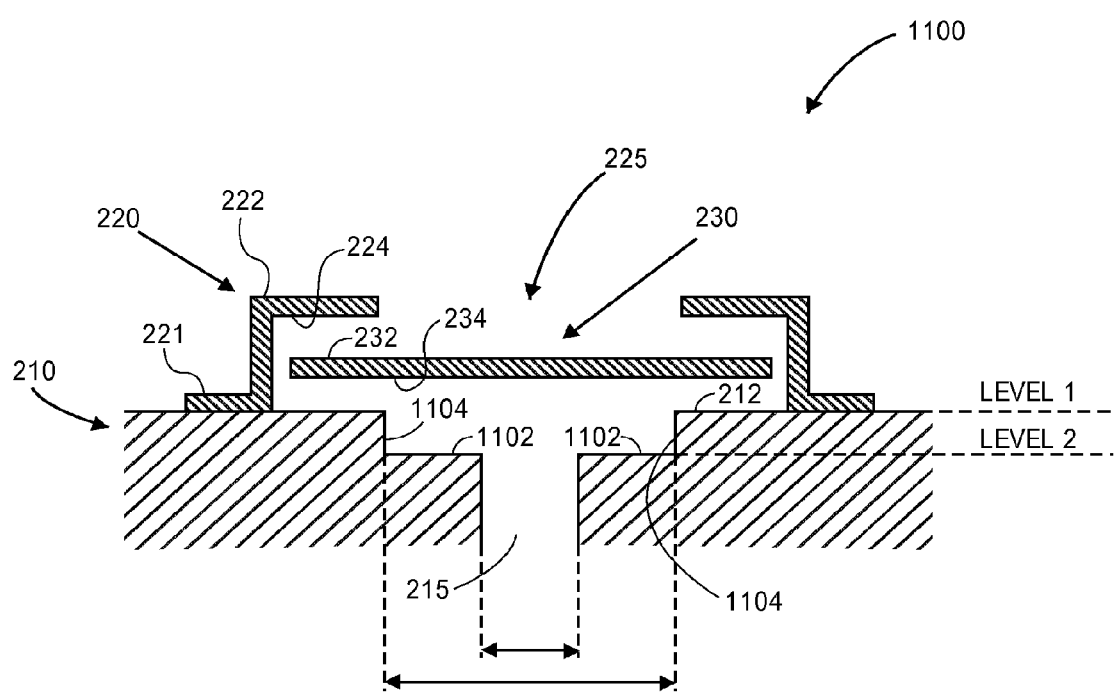
FIG. 11 is a cross-sectional view of components of a micro check valve having a multi-level valve seat and a floating member constructed in accordance with another embodiment.

Referring to FIG. 11, a micro check valve 1100 constructed according to a further embodiment includes a valve seat 210 having multiple levels (two levels are shown), a valve cap 220 a floating member 230. The valve seat 210, valve cap 220 and floating member 230 components are disposed inside a tube or outer wall (not shown in FIG. 11, shown in FIG. 25) that defines a fluid channel. The assembly of the in-channel components 210, 220, 230 may, for example, be inserted into an eye of a patient to regulate flow of aqueous humor and reduce intraocular pressure.

The multi-level valve seat 210 and is configured to provide "band pass" capabilities so that fluid will be allowed to pass through the valve 1100 when intraocular pressure is between a lower pressure and a higher pressure. These capabilities advantageously prevent excessive drainage of intraocular fluid during temporary instances of elevated intraocular pressure or intraocular pressure spikes, which may result from rubbing, pressing or hitting of the eye.

In the illustrated embodiment, the valve seat 210 includes two levels formed by a "step"—a first or top level (Level 1), which is the top surface 212 of the valve seat 210, and a second or lower level (Level 2), which is a lower or intermediate surface 1102 of the valve seat 210. A step down from the surface 212 to the surface 1102 is provided by vertical transition 1104 extending between the surfaces 212 and 1102.

In one embodiment, the valve cap 230 defines a single, central orifice 225, and the floating member 230 is a solid disc. The floating member 230 is movable between the bottom surface 224 of the valve cap 220 and surfaces 212, 1102 of the multi-level valve seat 210, as described in further detail with reference to FIGS. 12-24.

Figure 12:
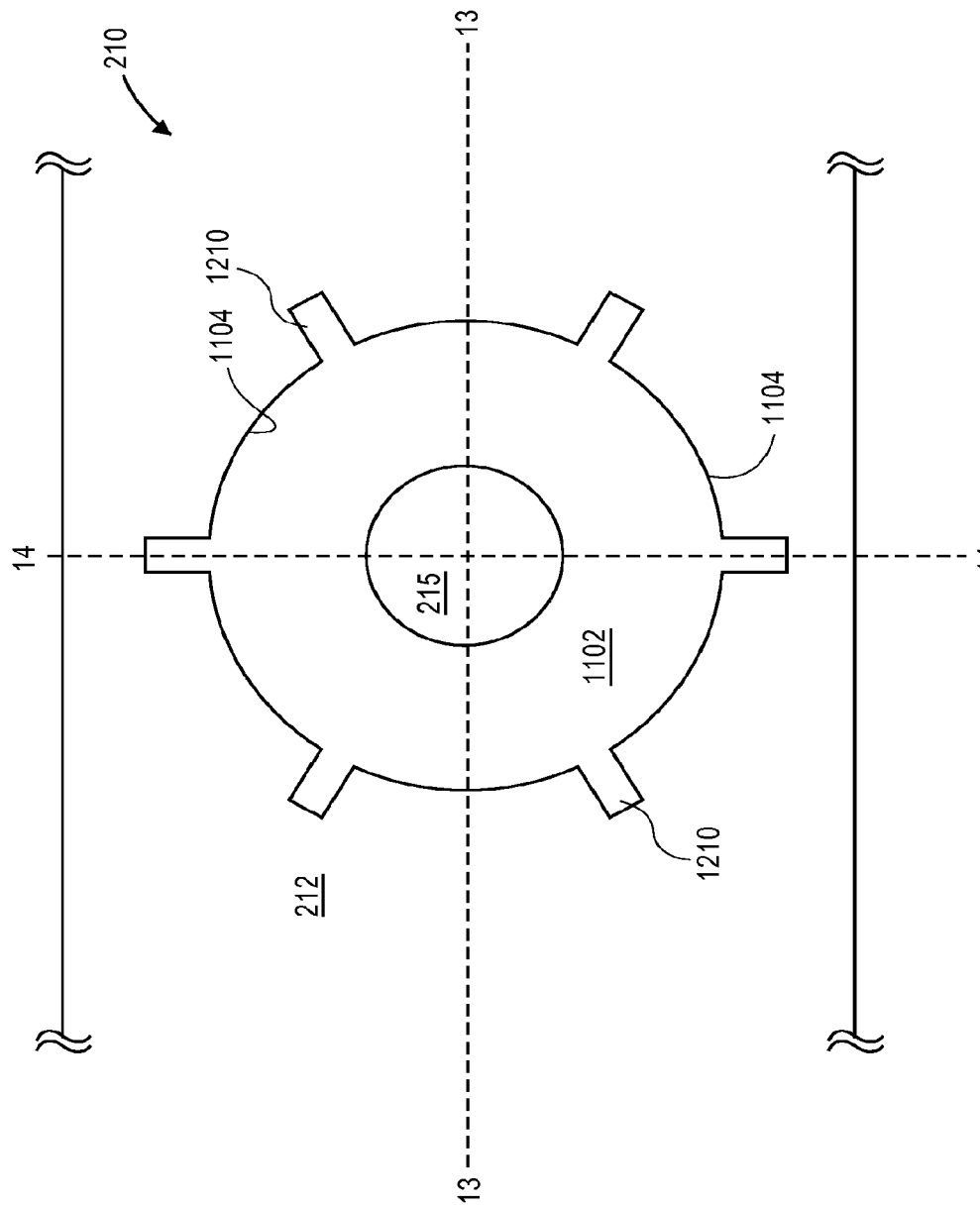
FIG. 12 is a top view of a portion of a multi-level valve seat including fluid channels according to one embodiment.

FIG. 12 is a top view of a bi-level valve seat 210 according to one embodiment and illustrates the first or top surface 212, the step down to the second or lower surface 1102 by transition 1104, and the fluid port 215. FIG. 12 also illustrates fluid channels 1210 (which are not shown in FIG. 11) that extend between the first and second levels. In the illustrated embodiment, the bi-level valve seat 210 defines six channels 1210, but other numbers of channels 1210 may be utilized. Further, in the illustrated embodiment, the channels 120 are formed in the valve seat 210 in a symmetrical arrangement, but other channel 1210 arrangements may also be utilized. Thus, the channel 1210 arrangement shown in FIG. 12 is provided as one example of how embodiments may be implemented.

Figure 13:
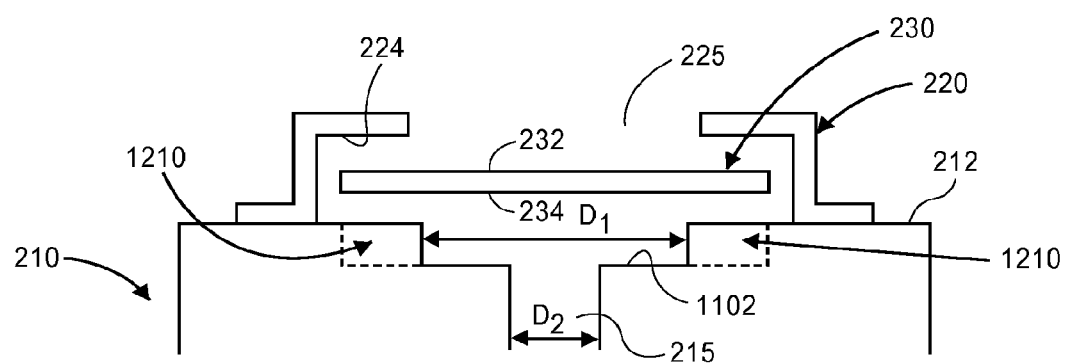
FIG. 13 is a cross-sectional view of the multi-level valve seat shown in FIG. 12 along line 13-13.
Figure 14:
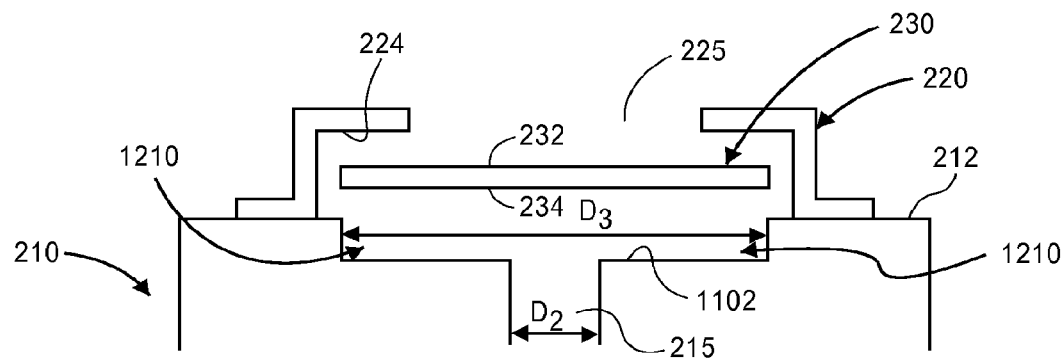
FIG. 14 is a cross-sectional view of the multi-level valve seat shown in FIG. 12 along line 14-14 showing a plurality of fluid channels.

FIG. 13 is a cross-sectional view of FIG. 12 along line 13-13, i.e., along a line that does not pass through a channel 1210 defined by the valve seat 210 given the exemplary channel 1210 arrangement shown in FIG. 12. Thus, the multi-level valve seat 210 defines a fluid port 215 having an upper section having a diameter D1, and a lower section having a diameter D2. FIG. 14 is a cross-sectional view of FIG. 12 along line 14-14, i.e., along a line that is through two channels 1210, and a corresponding upper section of the fluid port 215 having a larger diameter D3.

Referring to FIGS. 15-17, in one embodiment involving a bi-level valve seat 210, the floating member 230 is composed of a material and has a suitable thickness so that it is resilient or flexible and bendable between flat and curved or arcuate shapes. The degree of bending depends on the amount of pressure applied to the floating member 230.

More specifically, referring to FIG. 15, the floating member 230 remains in a flat configuration and is maintained in its original diameter when no pressure or low pressure (e.g. less than a threshold pressure) is applied to the floating member 230. Referring to FIG. 16, with increased fluid pressure, the floating member 230 begins to bend which, in turn, results in a corresponding reduction of diameter when viewed from the top or bottom of the floating member 230. Referring to FIG. 17, with additional fluid pressure, the floating member 230 bends further, resulting in a further diameter reduction. The floating member 230 may be resilient so that it may assume its original flat shape as pressure is reduced. Thus, the floating member 230 can transition between flat and non-flat shapes with varying fluid pressure.

Figure 18:
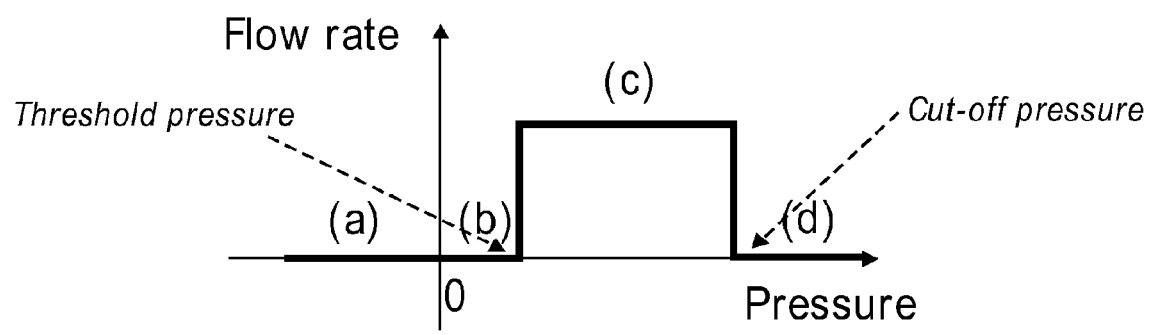
FIG. 18 is a graph generally illustrating how a micro check valve having a multi-level valve seat according to one embodiment functions as a band pass valve to halt fluid flow at pressures above a cut-off pressure.

Referring to FIG. 18, a micro check valve 1110 having a multi-level valve seat 210 and a bendable or resilient floating member 230 is configured to provide band pass characteristics so that flow is permitted within a certain range of pressures. Fluid cannot flow from the eye and to the external environment through the valve 1100 at negative pressure and sufficiently low positive intraocular pressure (stage a). Fluid begins to flow if the pressure applied to the floating member 230 is greater than a threshold pressure (b), at which point the shape of the floating member 230 changes, thereby opening a fluid path from the eye and through the orifice 225 of the valve cap 220, around at least a portion of the floating member 230, and through the port 215 to the external environment. According to one embodiment, the micro check valve 1100 is configured so that the threshold pressure is about 15-20 mm Hg. It should be understood that other threshold pressures may be utilized with other valve 1100 configurations and applications.

Fluid flow will continue so long as the pressure on the floating member 230 is greater than the threshold pressure (b), but less than a higher, cut-off pressure (d). When the floating member 230 is subject to fluid pressures greater than the cut-off pressure, the floating member 230 bends to an even greater degree to block the port 215, thereby closing the valve 1100. The operation of the valve 1100 is described in further detail with reference to FIGS. 19-23.

Figures 19, 20, 22, 24:
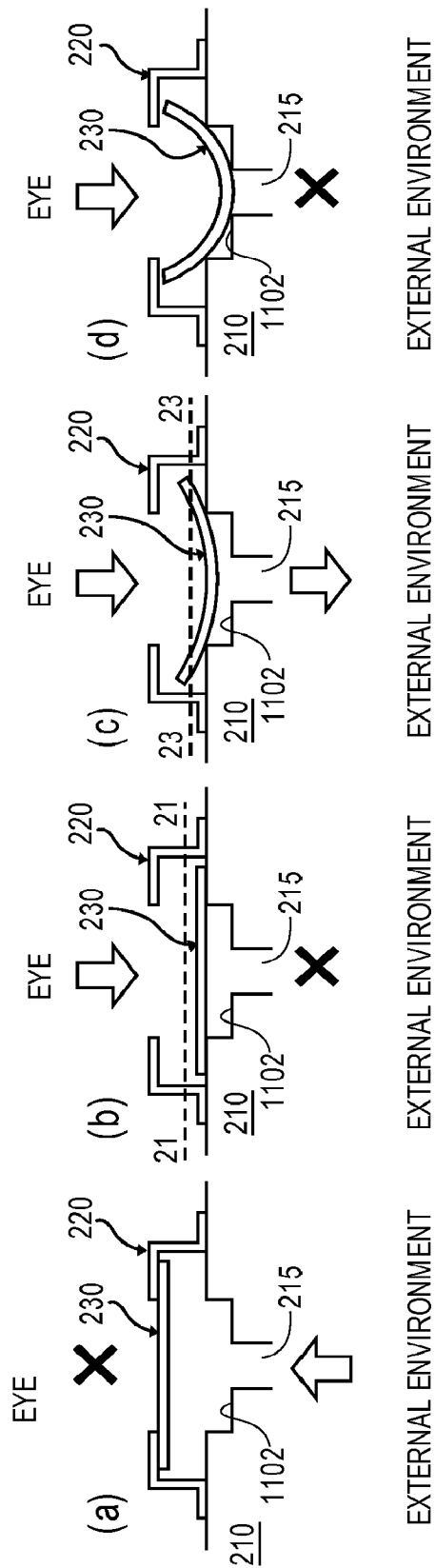
FIG. 19 is a cross-sectional view of components of a micro check valve constructed according to one embodiment having a multi-level valve seat in a closed position when negative or insufficient positive pressure is applied to a resilient floating member, represented as stage (a) in FIG. 18.
FIG. 20 is a cross-sectional view of components of a micro check valve shown in FIG. 19 having a multi-level valve seat port that remains closed when the resilient flexible member is subjected to a positive pressure less than a threshold pressure, represented as stage (b) in FIG. 18.
FIG. 22 is a cross-sectional view of components of a micro check valve shown in FIG. 19 having a multi-level valve seat port that is opened when a resilient flexible member is bent under positive pressure greater than a threshold pressure, represented as stage (c) in FIG. 18.
FIG. 24 is a cross-sectional view of components of a micro check valve shown in FIG. 19 having a multi-level valve seat that is closed when a resilient flexible member is bent to a greater degree under positive pressure greater than a cut-off pressure, thereby causing sealing a valve seat port to be closed, represented as stage (d) in FIG. 18.

Referring to FIG. 19, if negative pressure is applied to the valve 1100 from the external environment (stage a), the valve 1100 remains closed to prevent reverse leakage by pressure on the floating member pushing the top surface 232 of the floating member 230 to be pushed flat against the bottom surface 224 of the valve cap 220. This causes the orifice 225 of the valve cap 220 to be sealed, thereby preventing reverse leakage into the eye.

Figure 21:
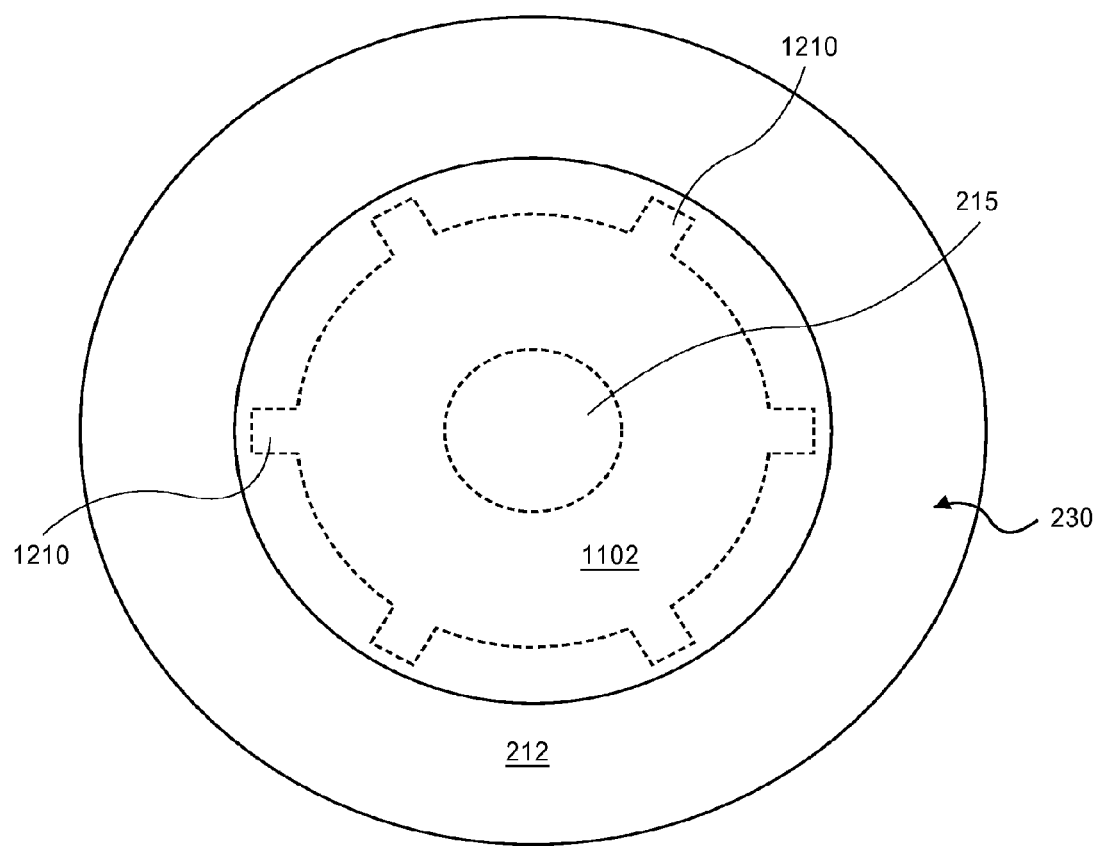
FIG. 21 is a cross-sectional top view along line 21-21 of FIG. 20 further illustrating the resilient floating member pressed against a multi-level valve seat and covering fluid channels to close a port of the valve.

Referring to FIGS. 20 and 21, if intraocular pressure is greater than the pressure of the external environment, but less than the threshold pressure (stages a, b), then the intraocular pressure applied to the top surface 232 of the floating member 230 pushes the bottom surface 234 of the floating member 230 against the first level or top surface 212 of the valve seat 210. However, such low pressures are insufficient to bend the floating member 230, which remains flat or substantially flat (as shown in FIG. 15) as it is pushed against the first level or top surface 212 of the valve seat 210. This is further illustrated in FIG. 21, which shows the floating member 230 lying flat on the first surface 212, thereby covering the channels 1210 and the port 215 (shown in phantom in FIG. 18). As such, there is no open fluid path, and fluid remains within the space 240 above the floating member 230.

Figure 23:
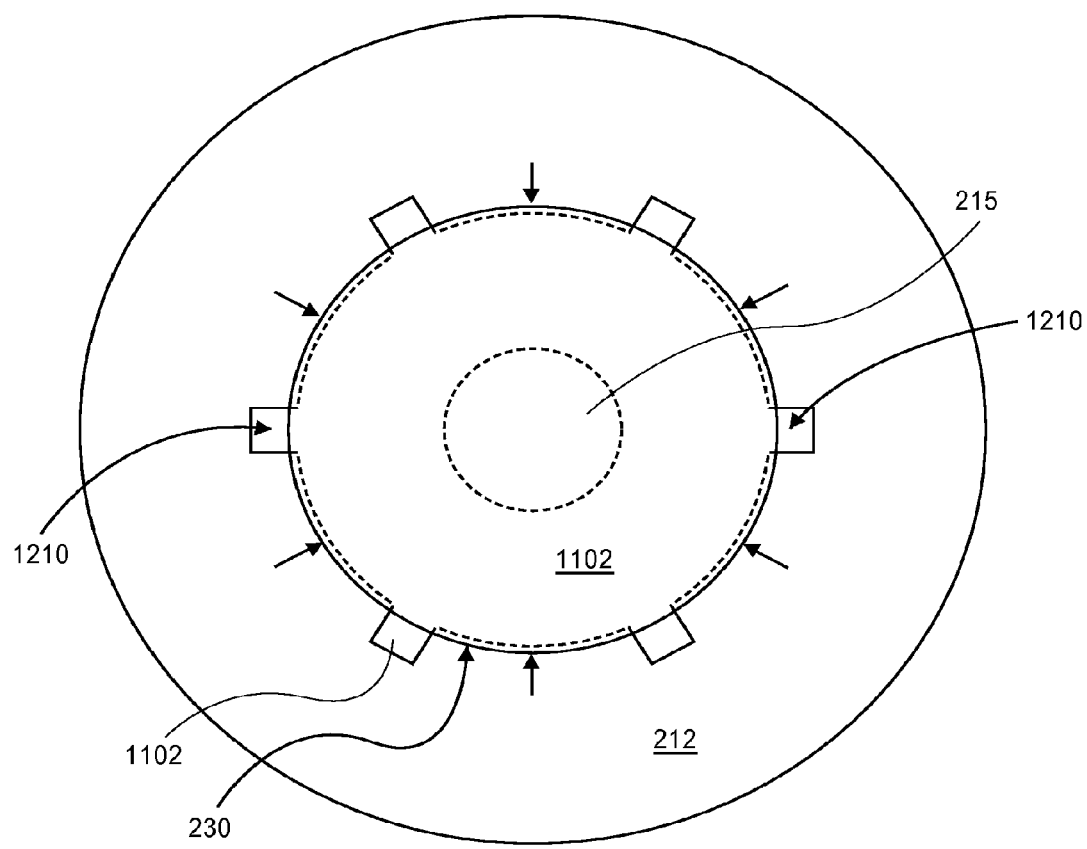
FIG. 23 is a cross-sectional top view along line 23-23 of FIG. 22 illustrating a resilient floating member being bent under fluid pressure and causing an outer edge of the floating member to be raised from the valve seat to open fluid channels.

Referring to FIGS. 22 and 23, if intraocular pressure is greater than the threshold pressure, but less than the cut-off pressure (stage c), then the intraocular pressure applied to the top surface 232 of the floating member 230 bends the floating member from its initial flat shape (FIG. 15) to a curved or arcuate shape (FIG. 16). At this stage, the central portion of the floating member 230 is pushed towards the second or lower surface 1102, but does not actually contact the second, lower surface 1120. Further, as a result of bending, the outer edge of the floating member 230 is raised upwardly from the top surface 212 of the valve seat 210 which, in turn, uncovers and opens the channels 1210 defined by the valve seat 120. As a result, fluid flows through the orifice 225 formed in the valve cap 220, over and/or around the outer edge of the floating member 230, through one or more open channels 1210, and out of the valve 1100 through the fluid port 215.

Referring to FIG. 24, the floating member 230 continues to bend further under increasing intraocular pressure until the intraocular pressure is greater than the cut-off pressure (stage d), at which point the floating member 230 is bent to such a degree that the floating member 230 contacts the second, lower surface 230 and closes the port 215. According to one embodiment, the micro check valve 1100 is configured so that the cut-off pressure is about 50-80 mm Hg. It should be understood that other cut-off pressures may be utilized with other valve 1100 configurations and applications. Upon exceeding the cut-off pressure, flow of fluid through valve 1100 is halted. Fluid may be trapped between the second surface 1102 and the bottom surface 234 of the floating member 230, in the channels 1210 and/or in the space 240 between the top surface 232 of the floating member 230 and the bottom surface 224 of the valve cap 220 until the pressure is reduced to flatten the floating member 230 to open the port 215 (stage c).

A micro check valve 1100 constructed and functioning as shown in FIGS. 11-24 may include a two-level valve seat 210 having a width of about 500 microns and a thickness of about 500 microns. The height of the transition sections 1104 may be about 5 microns. The port 215 may be centrally positioned and have a diameter of about 100 microns, and the length of each section 1102 at the second, lower level may be about 50 microns so that the diameter comprising two sections 1102 and the port is about 200 microns. The length of each channel 1210 may be about 10 microns, and the depth of a channel 1210 may extend to the second level. The orifice 225 of the valve cap 220 may have a width or diameter of about 150 microns. The resilient floating member 230 may a solid Parylene disc having a diameter of about 250 microns. A floating member 230 having these dimensions is sufficiently large to cover and close the channels 1210 while being bendable under intraocular pressure to open the channels 1210 and contact the second, lower surface 1102 to close the port 215.

The micro check valves described with reference to FIGS. 11-24 are particularly suitable for implantation in an eye to regulate intraocular pressure. For example, referring to FIG. 25, embodiments of an in-channel 2502 micro check valve 1100 having multi-level valve seat 210, valve cap 220 and floating member components 230 as illustrated in FIGS. 11-24 may advantageously be implanted in an eye without sutures using, for example, an anchor device described in U.S. application Ser. No. 11/205,757, filed Jul. 15, 2005, the contents of which are incorporated hereby by reference. In one sutureless implantation method, an incision is formed and a micro check valve 1100 within a channel or tube 2502 is inserted across the eyeball so that that a distal end 2505 of the in-channel valve 1100 protrudes outwardly beyond the eyewall, whereas the proximal end 2510 of the valve 1100 resides within the eye. The incision will naturally heal to form a scar, which encloses the distal end 2505 of the valve 1100, as shown in FIG. 25.

This implantation method and positioning of the in-channel valve 1100 results in three different pressures: P0 (ambient pressure, or the pressure of the external environment); P1 (intraocular pressure); P2 (pressure within the scar, otherwise referred to as "enclosed" pressure). Studies have confirmed that the enclosed pressure P2 is lower than the intraocular pressure P1, but higher than the ambient pressure P0. In other words, P0<P2<P1. Therefore, intraocular fluids may be passively controlled to flow through a micro check valve and then evaporate or diffuse away from the scar, thereby draining intraocular fluid and reducing intraocular pressure. There may be cases when a high pressure difference exists so that the ambient pressure is higher than the intraocular and enclosed pressure, e.g., due to a patient rubbing his or her eye. In these instances, the fluid port or outlet of the channel tube is shunted by the floating member 230 in order to prevent unnecessarily fluid leakage.

Referring to FIGS. 26A-I, a method 2600 of fabricating a micro check valve (e.g., a micro check valve 500 shown in FIGS. 5-7) according to one embodiment involves the combination of bulk-micromachining and multi-layer surface micromachining processes to apply alternating coatings of a sacrificial material (e.g., photoresist) and a material (e.g., Parylene) that will form the floating member 230, valve cap 220 and channel components. It should be understood that method steps can be utilized and/or adapted to fabricate micro check valves 800 shown in FIGS. 8-10 and micro check valves 1100 shown in FIGS. 11-25. For ease of explanation reference is made to a method for fabricating the valve 500 configured as shown in FIGS. 5-7 that has no cracking pressure, no reverse leakage at pressures greater than a breakdown pressure, and continuous flow of fluid through the valve 500.

At stage 2605, a substrate, such as a silicon wafer is provided and will serve as the valve seat 210. The substrate 210 may have a thickness of about 500 microns. An underside or bottom surface 211 of the substrate 210 is processed by known thermal oxidation and oxide patterning methods. For example, a wet oxide (such as silicon dioxide layer 2602) having a thickness of about 2 microns may be grown on the underside 211 of the silicon substrate 210.

At stage 2610, the oxide patterned silicon wafer is then etched using, e.g., deep reactive-ion etching (DRIE). Etching forms a cavity or aperture 2606 through the silicon dioxide layer 2602 and the underside 211 of the silicon wafer 210 and leaves a silicon membrane 2608. The depth of the aperture 2606 may be about 450 microns, and the silicon membrane 2608 may have a thickness of about 50 microns. The substrate 210 will later be processed to etch-away the membrane 2608 and open the aperture 2606 to form the fluid port 215, which will also serve as a port to strip away sacrificial photoresist during fabrication, as discussed in further detail below.

At stage 2615, a first sacrificial coating 2610 of photoresist is applied (e.g., by spin coating) to the top surface 212 of the substrate 210 and patterned. One suitable photoresist that may be utilized is a layer of AZ4620 type photoresist (supplied by Clariant Corp., Charlotte, N.C.), and the coating 2610 may have a thickness of about 2 microns. The first photoresist coating 2610 may be hard-baked at about 120° C. if applicable for smoothing of edges and degassing purposes.

At stage 2620, in the embodiments in which the valve cap and the floating member are both made of Parylene, a first layer or coating of Parylene is deposited and patterned on the first photoresist layer 2610 to define the shape and structural configuration of the eventual floating member 230. According to one embodiment, the thickness of the first Parylene layer 230 is about 1.5 microns, and Parylene patterning may be performed, e.g. using oxygen plasma etching with photoresist as a mask material. The first Parylene layer 230 (and other Parylene layers) may be roughened by a short period of oxygen plasma treatment to reduce stiction effect in the fabricated device.

At stage 2625, a second photoresist coating 2612 is applied over the previously applied first photoresist layer 2610 and the first Parylene layer 230 and patterned. The second photoresist coating 2612 may be an AZ4400 photoresist layer having a thickness of about 5 microns and may be spin-coated and patterned as necessary. The second photoresist layer 2612 is hard-baked at about 120° C. if applicable for smoothing and degassing purposes.

At stage 2630, a second layer or coating of Parylene, which will form the valve cap 220, is deposited and patterned over the second photoresist layer 2612 and over a portion of the top surface 212 of the silicon substrate 210. For this purpose, the top surface 212 of the silicon substrate 210 may be roughened using, e.g., $XeF_2$ gas-phase etching, before the second Parylene coating 220 is applied in order to promote adhesion of the second Parylene coating 220 to the silicon substrate 210. Surface roughening to enhance adhesion may be particularly beneficial for high pressure capacities, which require stronger Parylene—silicon seals. According to one embodiment, the thickness of the second Parylene layer 220 is about 3.0 microns, and Parylene patterning may be performed, e.g. using oxygen plasma etching with photoresist as a mask material, to pattern and form the desired orifice 225 configurations.

At stage 2635, a third photoresist coating 2614 is applied over the previously applied second Parylene layer 220 and patterned. The third photoresist coating 2614 may be an AZ4620 photoresist layer having a thickness of about 10 microns and may be spin-coated and patterned as necessary. The third photoresist coating 2614 may be hard-baked at about 120° C. if applicable for smoothing of edges and degassing purposes.

At stage 2640, a third Parylene layer 2502, which will form the fluidic channel or outer tube that contains the valve cap 220 and floating member 230 components, is deposited over the third photoresist layer 2614 and over a portion of the top surface 212 of the silicon substrate 210 and patterned. $XeF_2$ gas-phase etching may be performed to promote adhesion of the third Parylene coating 2520 to the silicon substrate 210. According to one embodiment, the thickness of the third Parylene layer 2502 may be about 5.0 microns, and Parylene patterning may be performed, e.g. using oxygen plasma etching with photoresist as a mask material At stage 2645, after the surface micromachining process and deposition of coatings or layers of alternating sacrificial material and valve component material, the silicon membrane 2608 is etched away from the backside 211 of the wafer 210 to create on or more through holes or fluid ports 215. In addition to serving as a fluid port, the port 215 also serves as an access point to the photoresist 2610, 2612, 2614, which can then be stripped away using acetone, thereby releasing the floating member 230, which is now free-floating and movable between the valve cap 220 and the valve seat 210 contained within the channel 2620. Upon fabrication, the micro check valve 500 should be stored in a liquid solution to prevent stiction of the floating member 230 and to prevent the floating member 230 from being tethered or bound to another component or surface. Further aspects of fabrication methods are described by P.-J. Chen and Y.-C. Tai, "Floating-disk Parylene micro check valve," Technical Digest, The 20$^{th}$ IEEE International Conference on Micro Electro Mechanical Systems (MEMS '07), Kobe, Japan, Jan. 21-25, 2007, pp. 453-456, the contents of which are incorporated herein by reference.

Figure 27:
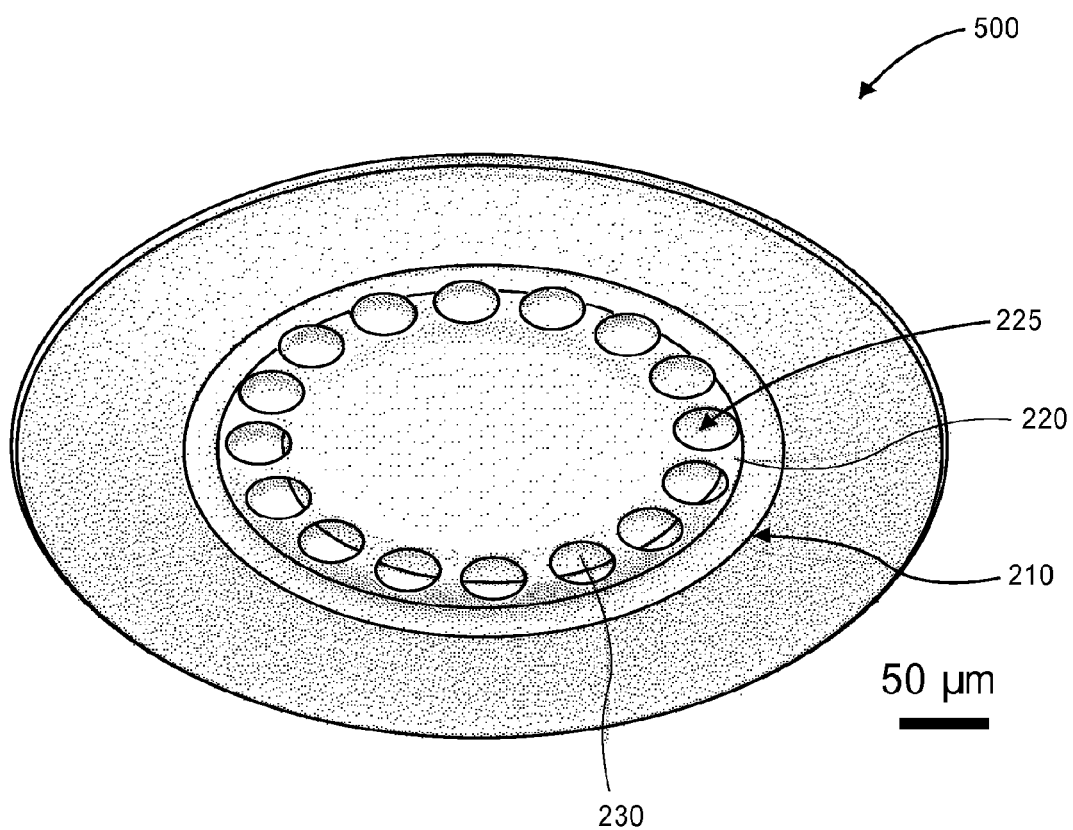
FIG. 27 is a scanning electron microscope image of a micro check valve fabricated using the method shown in FIGS. 26A-I and configured as shown in FIGS. 5-7 after drying.

FIG. 27 is a scanning electron microscope image of a micro check valve 500 (channel 2520 is not shown) having a floating Parylene member 230, configured as shown in FIGS. 5-7, and fabricated using method embodiments and after the valve 500 was removed from water and allowed to dry. FIG. 28 is a micrograph of an in-channel valve 500 fabricated using method embodiments, configured as shown in FIGS. 5-7, and contained in a liquid environment. FIG. 29 is a micrograph of an in-channel valve 800 fabricated using method embodiments, configured as shown in FIGS. 8-10 and also contained in a liquid environment.

Figure 30:
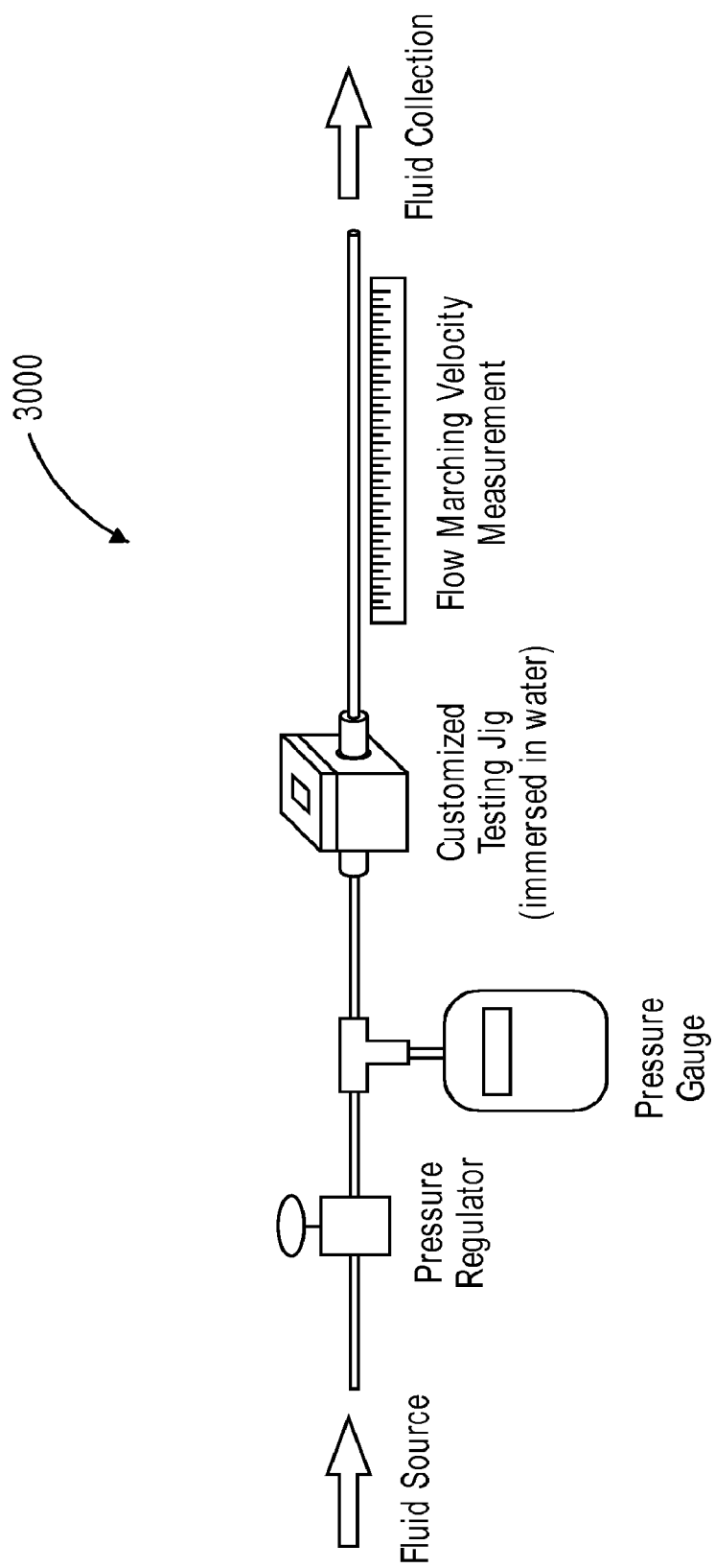
FIG. 30 illustrates a test system that was used to validate the operation of micro check valves constructed according to embodiments.

Fabricated microfluidic valves were tested under water using the test configuration 3000 shown in FIG. 30. A testing jig provided a fluidic interface with diced chips so that microflows could be introduced into fabricated micro check valves through the backside fluid ports 215 with appropriate tubing and fittings. Clean water was used as the working fluid, and the pressure was controlled to a resolution of about 70 Pa (~0.01 psi). Flow rate measurements were performed, and resulting fluid pressure/flow data is provided in FIG. 31.

Figure 31:
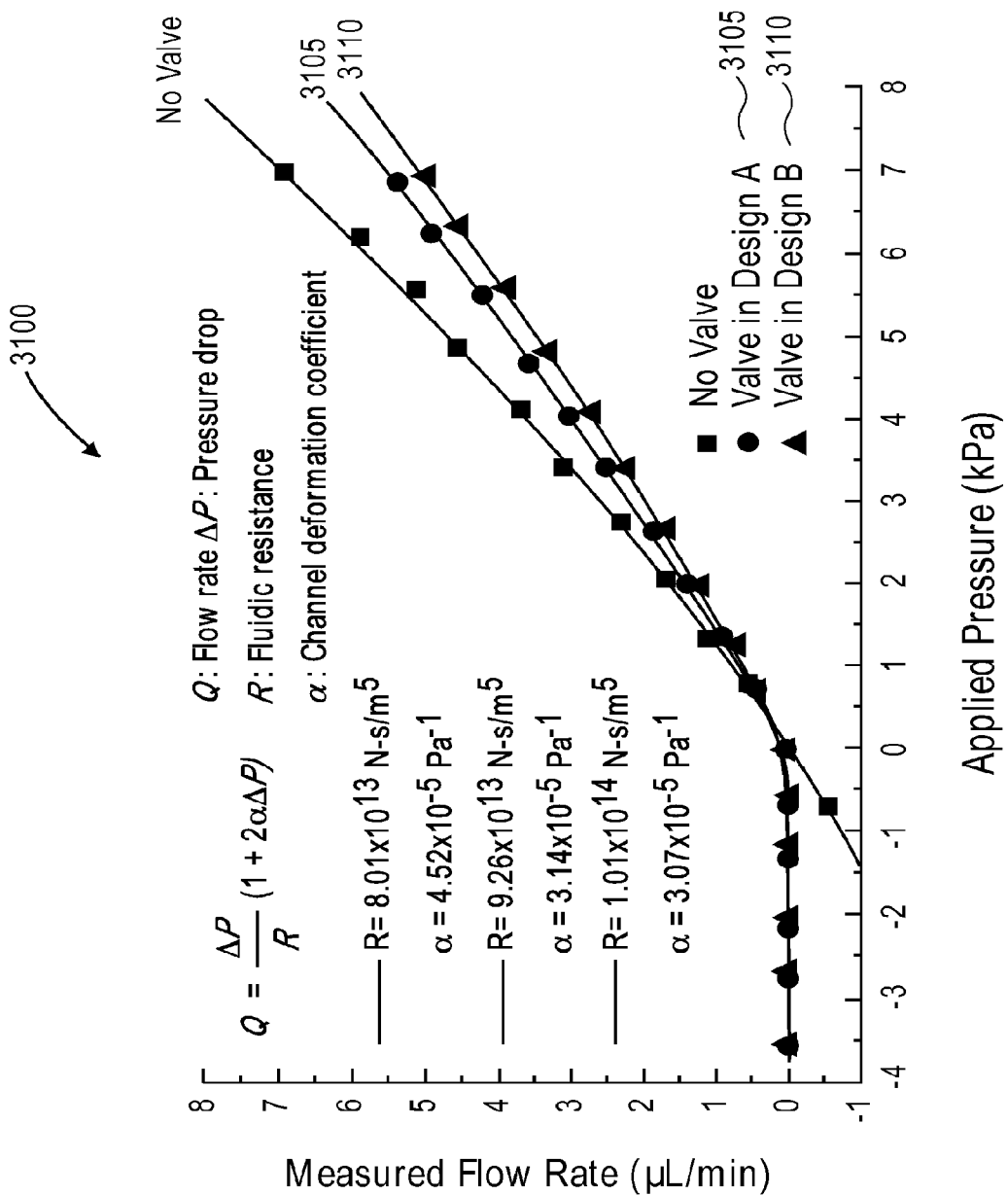
FIG. 31 is a graph illustrating test results obtained using the test system shown in FIG. 30.

FIG. 31 is a graph that includes data (3105) acquired during testing of a micro check valve 500 configured as shown in FIGS. 5-7, data (3110) acquired during testing of a micro check valve 800 constructed as shown in FIGS. 8-10 and control/known device that did not include any valve (No Valve) for comparison. Data in FIG. 31 demonstrate that micro check valves 500 and 800 exhibited no cracking pressure to the forward flow and no reverse leakage to the backward flow with pressure loadings down to 700 Pa. Further aspects of the test configuration and test results are described in P.-J. Chen and Y.-C. Tai, "Floating-disk Parylene micro check valve," Technical Digest, The $20^{th}$ IEEE International Conference on Micro Electro Mechanical Systems (MEMS '07), Kobe, Japan, Jan. 21-25, 2007, pp. 453-456, the contents of which was previously incorporated herein by reference.

Although references have been made in the foregoing description to various embodiments, persons of ordinary skill in the art will recognize that insubstantial modifications, alterations, and substitutions can be made to the described embodiments without departing from embodiments of the invention as recited in the accompanying claims. For example, although certain embodiments are described with regard to micro check valves and floating members having particular shapes, dimensions, pressures and materials, the design of a microfluidics valve according to embodiments may be adapted for use in different biomedical applications. Mechanical designs may also be adapted for different pressure parameters and different cut-off pressures (as in the multi-level valve seat described with reference to FIGS. 11-25). Further, the shape of the outer tube and resulting channel may vary in order to accommodate implantation.

Additionally, the fabrication process and materials may be changed to fabricate flexible devices rather than devices on a silicon substrate. Although embodiments are described with reference to Parylene, the valve cap, floating member and channel may be other materials, e.g., a biocompatible metal, and may be the same or different materials. Further, although embodiments are described with reference to a single valve having a valve cap, a floating member and a channel on a substrate, it should be understood that multiple valve devices can be fabricated on a single substrate.

Additionally, micro check valve embodiments were described with reference to a floating member being moved between a valve seat and a valve cap by fluid pressure, but it should be understood that an untethered, free-floating member may also be subjected to other forces to bias or facilitate movement of the floating member between the valve seat and the valve cap. For example, the floating member and one or both of the valve seat and the valve cap may include electrodes or other conductive elements that are utilized or activated to repel or attract the floating member by electrostatic, magnetostatic or electromagnetic forces.

Thus, embodiments are intended to cover alternatives, modifications, and equivalents that fall within the scope of the claims.

What is claimed is:

1. A method of fabricating a micro check valve having a floating member for controlling flow of fluid, the method comprising:
    depositing a plurality of polymer layers and a plurality of sacrificial layers on a substrate in an alternating manner, the substrate comprising a multi-level valve seat, the plurality of polymer layers including a first polymer layer comprising the floating member, a second polymer layer comprising a valve cap, and a third polymer layer comprising an outer wall defining a fluid channel; and
    removing the plurality of sacrificial layers, thereby forming an in-channel microfluidic valve having a floating polymer member that is movable between the valve seat and the polymer valve cap by application of pressure on the floating member by a fluid to passively control flow of the fluid through the multi-level valve seat and the valve cap, wherein the multi-level valve seat, the valve cap and the floating member are configured to permit flow of the fluid when the fluid pressure is between a threshold pressure and a cut-off pressure and to stop flow of the fluid when the fluid pressure exceeds the cut-off pressure.

2. The method of claim 1, further comprising forming the multi-level valve seat.

3. The method of claim 2, wherein forming the multi-level valve seat comprises patterning and etching a substrate wafer.

4. The method of claim 1, wherein the valve seat comprises silicon.

5. The method of claim 1, wherein the polymer comprises parylene.

6. The method of claim 1, further comprising patterning at least one of the polymer or sacrificial layers.

7. The method of claim 1, wherein the sacrificial layers are removed by stripping with acetone.

8. A method of fabricating a micro check valve having a floating member for controlling flow of fluid, the method comprising:
    depositing a plurality of polymer layers and a plurality of sacrificial layers on a substrate in an alternating manner, the substrate comprising a multi-level valve seat having a first surface at a first level and a second surface at a second, lower level, the plurality of polymer layers including a first polymer layer comprising the floating member, a second polymer layer comprising a valve cap, and a third polymer layer comprising an outer wall defining a fluid channel; and
    removing the plurality of sacrificial layers, thereby forming an in-channel microfluidic valve having a floating polymer member that is movable between the valve seat and the polymer valve cap by application of pressure on the floating member by a fluid to passively control flow of the fluid through the multi-level valve seat and the valve cap, wherein the valve seat defines a fluid port and at least one fluid channel in fluid communication with the fluid port, and the floating member can bend under fluid pressure between a flat shape for temporarily sealing the at least one fluid channel and an arcuate shape.

9. The method of claim 8, further comprising forming the multi-level valve seat.

10. The method of claim 9, wherein forming the multi-level valve seat comprises patterning and etching a substrate wafer.

11. The method of claim 8, wherein the valve seat comprises silicon.

12. The method of claim 8, wherein the polymer comprises parylene.

13. The method of claim 8, further comprising patterning at least one of the polymer or sacrificial layers.

14. The method of claim 8, wherein the sacrificial layers are removed by stripping with acetone.

* * * * *